US012508288B2

(12) United States Patent
Vergalito et al.

(10) Patent No.: US 12,508,288 B2
(45) Date of Patent: *Dec. 30, 2025

(54) BACTERIAL STRAIN AND MEDICAL USES THEREOF

(71) Applicant: Aileens Pharma S.R.L., Nova Milanese (IT)

(72) Inventors: Franca Vergalito, Lucito (IT); Sonia Longo Sormani, Nova Milanese (IT); Irene Magnifico, Isernia (IT); Laura Pietrangelo, Isernia (IT); Roberto Maria Antonio Di Marco, Catania (IT); Marco Alfio Cutuli, Acireale (IT); Noemi Venditti, Bojano (IT); Giulio Petronio Petronio, Catania (IT)

(73) Assignee: Aileens Pharma S.R.L., Nova Milanese (IT)

( * ) Notice: Subject to any disclaimer, the term of this patent is extended or adjusted under 35 U.S.C. 154(b) by 543 days.

This patent is subject to a terminal disclaimer.

(21) Appl. No.: 17/798,420

(22) PCT Filed: Feb. 18, 2021

(86) PCT No.: PCT/EP2021/054083
§ 371 (c)(1),
(2) Date: Aug. 9, 2022

(87) PCT Pub. No.: WO2021/165434
PCT Pub. Date: Aug. 26, 2021

(65) Prior Publication Data
US 2024/0024375 A1 Jan. 25, 2024

(30) Foreign Application Priority Data
Feb. 18, 2020 (IT) .................. 102020000003233

(51) Int. Cl.
| A61K 35/74 | (2015.01) |
| A61K 9/00 | (2006.01) |
| A61P 15/02 | (2006.01) |
| A61P 17/00 | (2006.01) |

(52) U.S. Cl.
CPC ............ *A61K 35/74* (2013.01); *A61K 9/0014* (2013.01); *A61P 15/02* (2018.01); *A61P 17/00* (2018.01)

(58) Field of Classification Search
None
See application file for complete search history.

(56) References Cited

FOREIGN PATENT DOCUMENTS
| JP | H0987134 A | 3/1997 |
| WO | 2015106175 A1 | 7/2015 |

OTHER PUBLICATIONS

Francuzik, W. et al., "Propionibacterium acnes Abundance Correlates Inversely with Staphylococcus aureus: Data from Atopic Dermatitis Skin Microbiome", Acta Derm Venereol., 98, doi: 10.2340/00015555-2896, 2018, 490-495.
Shu, M. et al., "Fermentation of Propionibacterium acnes, a Commensal Bacterium in the Human Skin Microbiome, as Skin Probiotics against Methicillin-Resistant *Staphylococcus aureus*", PLOS ONE, 8(2), https://doi.org/10.1371/journal.pone.0055380, Feb. 6, 2013, 11 pgs.
Boccardi, M. , "Ultra-Hypofractionated Whole Breast Radiotherapy with Automated Hybrid-VMAT Technique: A Pilot Study on Safety, Skin Toxicity and Aesthetic Outcomes", Breast Cancer: Targets and Therapy, 16, Sep. 16, 2024, 611-619.
Magnifico, I. , "A Wall Fragment of Cutibacterium acnes Preserves Junctional Integrity Altered by *Staphylococcus aureus* in an Ex Vivo Porcine Skin Model", Pharmaceutics, 15(4):1224, doi: 10.3390/pharmaceutics15041224., Apr. 12, 2023.
Petronio, G. P, "Targeting *S. aureus* Extracellular Vesicles: A New Putative Strategy to Counteract Their Pathogenic Potential", Pharmaceutics, 16(6):789, doi: 10.3390/pharmaceutics16060789, Jun. 11, 2024, 1-17.
Pietrangelo, L. , "Efficacy and Microbiota Modulation Induced by LimpiAL 2.5%, a New Medical Device for the Inverse Psoriasis Treatment", Int J Mol Sci, 24(7):6339, doi: 10.3390/ijms24076339., Mar. 28, 2023, 1-23.
Pietrangelo, L. , "LimpiAD foam and the potential control of the pressure ulcers onset", Biomed Pharmacother, 144:112327, doi: 10.1016/j.biopha.2021.112327, Dec. 2021, 1-11.

*Primary Examiner* — Brian Gangle
(74) *Attorney, Agent, or Firm* — Elmore Patent Law Group, P.C.; Joseph C. Zucchero; Carolyn S. Elmore

(57) ABSTRACT

The present invention relates to a selected bacterial strain of *Cutibacterium acnes* and/or a cell wall therefrom or a post-biotic of the strain and to medical or nutritional uses thereof. The invention also concerns with pharmaceutical or nutritional compositions containing the strain, cell wall or postbiotic therefrom for the prevention or treatment of inflammatory diseases such as dermatitis or psoriasis or infections, especially skin or mucosal fungal or bacterial infections.

18 Claims, 10 Drawing Sheets
Specification includes a Sequence Listing.

FIGURES 5 A and 5B
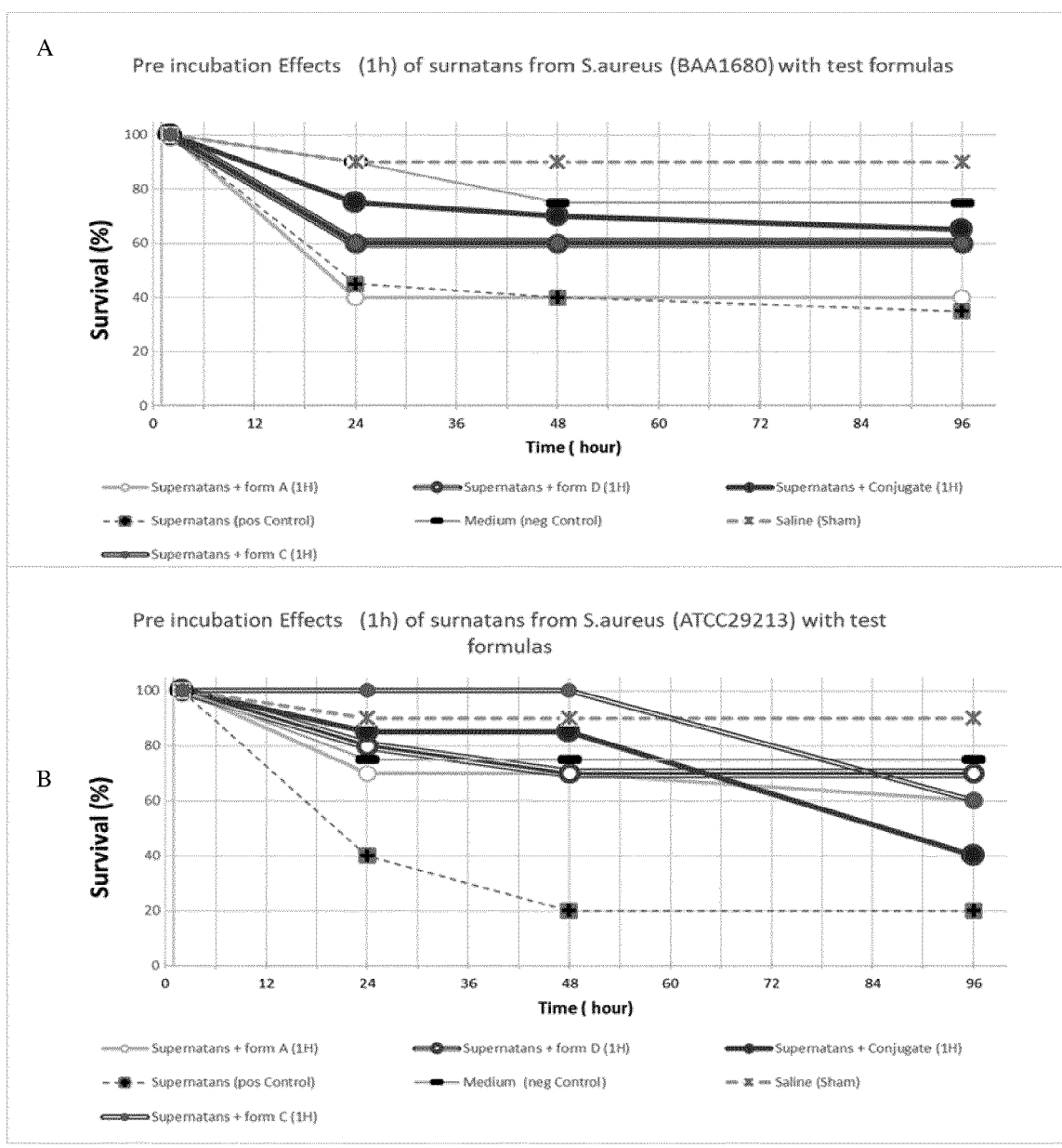

FIGURES 6 A and 6B
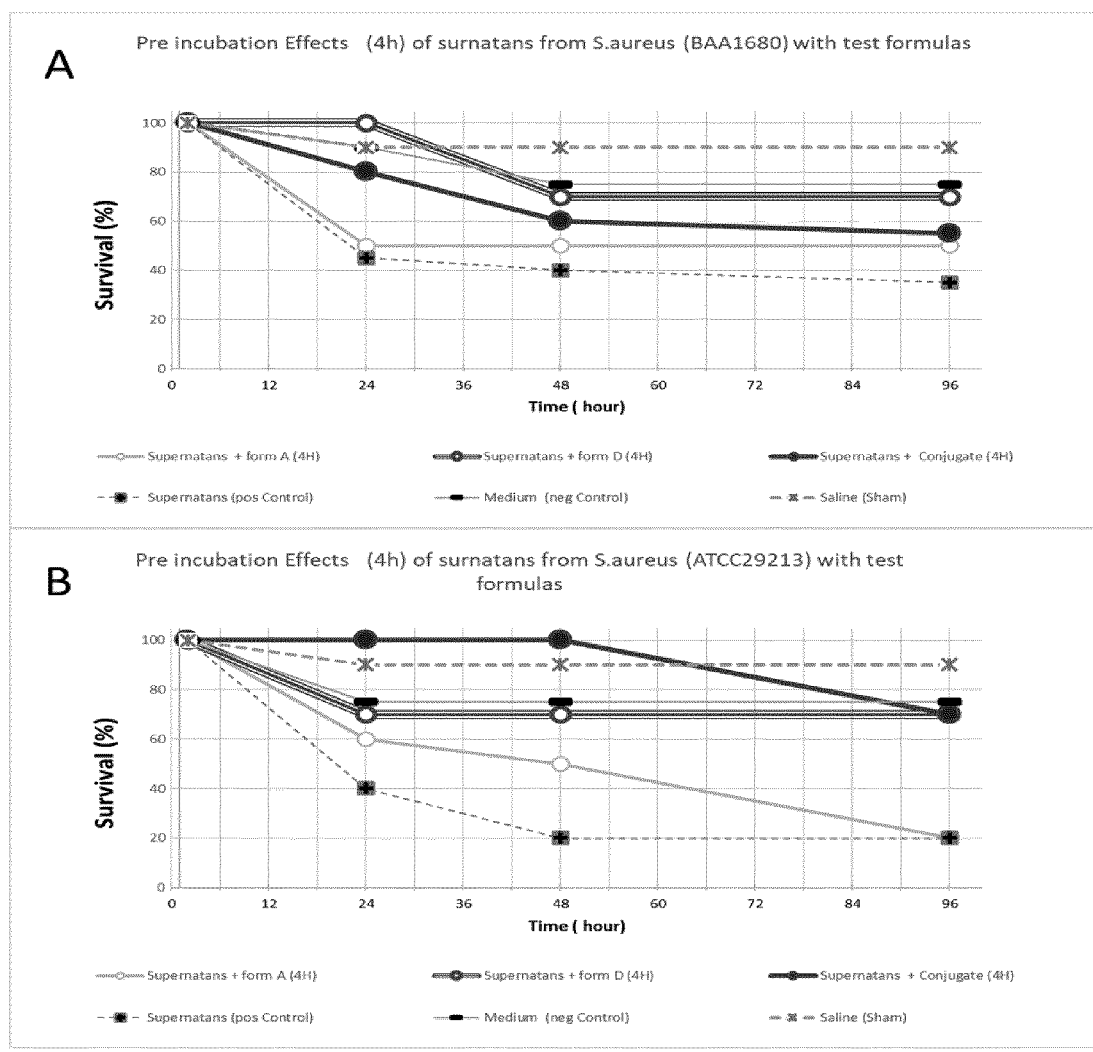

SEQUENCE LISTING

```
<160> NUMBER OF SEQ ID NOS: 10

<210> SEQ ID NO 1
<211> LENGTH: 20
<212> TYPE: DNA
<213> ORGANISM: Artificial Sequence
<220> FEATURE:
<223> OTHER INFORMATION: EF1 Forward primer

<400> SEQUENCE: 1
aacctcctta cagtgaatcc                                              20

<210> SEQ ID NO 2
<211> LENGTH: 18
<212> TYPE: DNA
<213> ORGANISM: Artificial Sequence
<220> FEATURE:
<223> OTHER INFORMATION: EF1 Reverse primer

<400> SEQUENCE: 2
atgttatctc cgtgccag                                                18

<210> SEQ ID NO 3
<211> LENGTH: 21
<212> TYPE: DNA
<213> ORGANISM: Artificial Sequence
<220> FEATURE:
<223> OTHER INFORMATION: Impi forward primer

<400> SEQUENCE: 3
tagtaagcag tagcatagtc c                                            21

<210> SEQ ID NO 4
<211> LENGTH: 18
<212> TYPE: DNA
<213> ORGANISM: Artificial Sequence
<220> FEATURE:
<223> OTHER INFORMATION: Impi reverse primer

<400> SEQUENCE: 4
gccatcttca cagtagca                                                18

<210> SEQ ID NO 5
<211> LENGTH: 20
<212> TYPE: DNA
<213> ORGANISM: Artificial Sequence
<220> FEATURE:
<223> OTHER INFORMATION: Glutaraldehyde forward primer

<400> SEQUENCE: 5
```

```
ccacactgtg aggcaacatt                                              20

<210> SEQ ID NO 6
<211> LENGTH: 20
<212> TYPE: DNA
<213> ORGANISM: Artificial Sequence
<220> FEATURE:
<223> OTHER INFORMATION: Glutaraldehyde reverse primer

<400> SEQUENCE: 6
gtttgcttag cacggtcaca                                              20

<210> SEQ ID NO 7
<211> LENGTH: 20
<212> TYPE: DNA
<213> ORGANISM: Artificial Sequence
<220> FEATURE:
<223> OTHER INFORMATION: Cytokine forward primer

<400> SEQUENCE: 7
cgagctaaag acaggcgatt                                              20

<210> SEQ ID NO 8
<211> LENGTH: 20
<212> TYPE: DNA
<213> ORGANISM: Artificial Sequence
<220> FEATURE:
<223> OTHER INFORMATION: Cytokine reverse primer

<400> SEQUENCE: 8
tcacctgcgg ttgaatcata                                              20

<210> SEQ ID NO 9
<211> LENGTH: 20
<212> TYPE: DNA
<213> ORGANISM: Artificial Sequence
<220> FEATURE:
<223> OTHER INFORMATION: Phagoc forward primer

<400> SEQUENCE: 9
attgctagcc aggttcagga                                              20

<210> SEQ ID NO 10
<211> LENGTH: 20
<212> TYPE: DNA
<213> ORGANISM: Artificial Sequence
<220> FEATURE:
<223> OTHER INFORMATION: Phagoc reverse primer

<400> SEQUENCE: 10
agctatttgg cggaaactca                                              20
```

BACTERIAL STRAIN AND MEDICAL USES THEREOF

FIELD OF THE INVENTION

The present invention relates to a selected bacterial strain belonging to the genus *Cutibacterium*, species *acnes* and to medical use thereof and to pharmaceutical and nutritional compositions containing the same strain.

The present invention origins in the microbiological field and finds applications in the pharmaceutical, cosmetics and nutritional fields.

Specifically, the invention relates to either a selected strain of *Cutibacterium acnes* and to postbiotics and cell wall fragments of the strain that through structural microbial components and/or by producing substances promote the growth of fibroblast cells. The strain of the invention, fragments of its wall and postbiotics thereof have anti-inflammatory and antibacterial activities. Preferably, the selected bacterial strain or fragments of its wall are for topical application for treating dermatological disorders, infections or skin affections.

BACKGROUND

Inflammation essentially is a biological response to a harmful stimulus or injury of a tissue of the organism which may be caused by external causes such at the contact with irritating agents or microorganisms. Inflammation is considered as a protective response of the body aimed at eliminating the cause of tissue injury, clear out necrotic tissues damaged from the original insult and the inflammatory process, and initiate tissue repair. This response of the organism involves the immune cells and molecular mediators.

At present inflammation is treated with the systemic or topical administration of non-steroidal or steroidal anti-inflammatory drugs. Despite the widespread of the anti-inflammatory agents, some residual risks remain that inflammation may persist after the treatment with anti-inflammatory drugs. In addition, the anti-inflammatory treatment is not free of side effects either in case of topical application and of systemic administration.

In the last years the occurrence of side effects in case of the topical administration is increase due to the abuse or misuse of steroidal creams aimed at treating inflammation of the skin.

Therefore, at present there is the need to have new products provided with anti-inflammatory activity whose use even for a prolonged time is not affected by serious side effects.

Similar problems arise in the dermatological and gynecological field, in case of skin or mucosa infections.

The abuse of antibiotic products for topical use for treating skin infections has increased the number of cases of resistance to the local antibiotic therapy, forcing the physician to prescribe antibiotics of second generation.

Therefore, at present there is the need for having new products provided with anti-inflammatory and/or possibly even antimicrobial activity, which are alternative to the commercially available medicines.

One of the aim of the present invention resides in providing a product provided with anti-inflammatory and possibly antimicrobial or antifungal activity whose use is substantially free of side effects. It is also desirable to provide a product which is active in controlling human microbiota.

Another aim of the invention resides in the provision of a non-steroidal product provided with anti-inflammatory activity, which is specifically aimed at the topical application on the skin or mucosae such as vaginal mucosae.

The latter is, in general, addressed against pathogens bacteria and/or fungi, working, depending on the target, either as a bactericidal or bacteriostatic or as a fungicidal or fungistatic agent.

On the other hand, by contrasting the pathogens, a more rapid restoration of homeostasis conditions is achieved through the normalization of the resident microbiome.

SUMMARY OF THE INVENTION

The present invention origins from the finding that a selected bacterial strain of the genus *Cutibacterium*, species *acnes* promotes the proliferation of fibroblasts and has the ability of interfering with the growth of most of the common bacteria and fungi, especially those affecting the human skin.

In particular the selected bacterial strain of *Cutibacterium acnes* as defined in claim 1, fragments of its cellular wall or postbiotics or composition containing the same as defined herein, show a regulation on immune system combined with an improved inhibitory effect on pathogen microorganisms of the skin. These effects are in part related to an interference by the strain with pathogen attachment to host cells.

In addition, the inventors found that living or killed bacterial strains or part of them such as fragments of their wall of the invention produces substances or by-products which promote the growth and migration of the fibroblast cells. This property further supports the use of the selected strain or of substances produced thereby as—immunomodulant agents and make it a suitable candidate for applications in the dermatological or gynaecological field, especially in the treatment of bacterial or fungal skin infections especially of *Candida Albicans* or bacterial infections.

Accordingly, the present invention provides, in a first aspect, a bacterial strain of the genus *Cutibacterium* species *acnes* deposited with accession number (or filing number) DSM 28251 at the International Deposit Authority Leibniz-Institut DSMZ—Deutsche Sammlung von Mikroorganismen and Zellkulturen GmbH, or to a variant which is essentially derived from said strain.

In an aspect the invention provides medical uses of the above-mentioned bacterial strain *Cutibacterium acnes* deposited with accession number DSM 28251. In accordance with this aspect, the strain of the invention is for topical or systemic administration.

Systemic administration means a route of administration of a medicament, nutrition including the strain of the invention into the circulatory system so that the entire body is affected. Administration can take place via enteral, oral administration or parenteral administration for example by injection, infusion, or implantation.

Topical administration or application is the preferred rout of administration of the *Cutibacterium acnes* DSM 28251 according to the present invention. The *Cutibacterium acnes* DSM 28251, postbiotic, fragments of cell wall and compositions containing the same of fragments thereof may be applied on the skin in any forms suitable for topical application.

In accordance with another aspect, the invention provides for strains or variants of bacterial strain DSM 28251 as identified above, which are essentially derived by spontaneous mutation, induced mutation and selection, hybridization and selection or other methods of genetic manipulation, and can be tracked back to it. In another aspect, the invention concerns with postbiotics of the above strain and medical or nutritional uses thereof.

The bacterial strain, according to the present invention, may be isolated and selected from healthy skin, among the multitude of strains that composes the skin microbiome.

According to yet another aspect, the invention relates to bacterial strain *Cutibacterium acnes*, deposited with accession number DSM 28251 at the International Deposit Authority Leibniz-Institut DSMZ—Deutsche Sammlung von Mikroorganismen and Zellkulturen GmbH, or a variant essentially derived from said strain, for use in the prevention or treatment of an inflammatory disease or infection, especially of the skin or mucosae.

Preferably, the bacterial strain of the invention finds applications in the dermatological and gynaecological field, for example in the treatment of skin or mucosal inflammation or infections from bacteria, fungi or protozoa. In particular, the above strain is effective in the prevention and or treatment of infections especially of the skin.

The selected strain of the invention is effective in the treatment of fungi especially yeasts of the genus *Candida* spp, especially *Candida Albicans*, or dermatophytes such as *Malassezia* spp, both are among the most common causative agents of opportunistic infections of the human body. In addition, the selected strain of the invention is used in the treatment of fungal infections which are resistant to the antifungal products available on the market.

The invention also provides for the proctological use of the *Cutibacterium acnes* DSM 28251 especially heat-killed, postbiotic or wall fragment of this strain, or a topical composition thereof, especially in the treatment of haemorrhoids or anal rhagades or skin scars.

In another aspect the invention concerns with a composition of hyaluronic acid with a fragment of the bacterial wall of *C. acnes* DSM 28251, in particular for use in the treatment of wounds, abrasion, ulcerations of the skin for example pressure ulcers. A further aspect of the invention concerns with the cosmetic use of the above-identified bacterial strain for ameliorating an aesthetic aspect of the skin such as redness or couperose.

According to another aspect the invention concerns with nutritional uses of the above identifies strain or of a postbiotic obtained thereby.

BRIEF DESCRIPTION OF THE FIGURES

The invention will now be described in detail and in reference to the attached Figures, wherein:

FIGS. 5A and 5B show graphs illustrating the survival rate of *Galleria mellonella* larvae after injection with supernatants from *S. aureus* ATCC BAA1680 (At) and *S. aureus* ATCC 29213 (B) cultures pre-incubated with formulations tested for 1 h according to Example 4. Supernatans+formA" stands for supernatant incubated with LimpiAD A, "Supernatans+formD" for supernatant incubated with the formulation LimpiAD D, "Supernatans+wall" supernatant incubated with LimpiAD active components, "Supernatans" pos control, "Medium" for cultural medium alone (no bacterial culture), "Saline" for Sham treatment.

FIGS. 6A and 6B show graphs illustrating the survival rate of *Galleria mellonella* larvae after injection with supernatants from *S. aureus* ATCC BAA1680 (A) and *S. aureus* ATCC 29213 (B) cultures pre-incubated with tested formulations for 4 h, according to Example 4. "Supernatans+formA" stands for supernatant incubated with formulation LimpiAD A (as defined in Example 4), "Supernatans+formD" for supernatant incubated with LimpiAD D, "Supernatans+wall" supernatant incubated with LimpiAD active components, "Supernatans" pos control, "Medium" for cultural medium alone (no bacterial culture), "Saline" for Sham treatment.

DETAILED DESCRIPTION OF THE INVENTION

Figure 1:
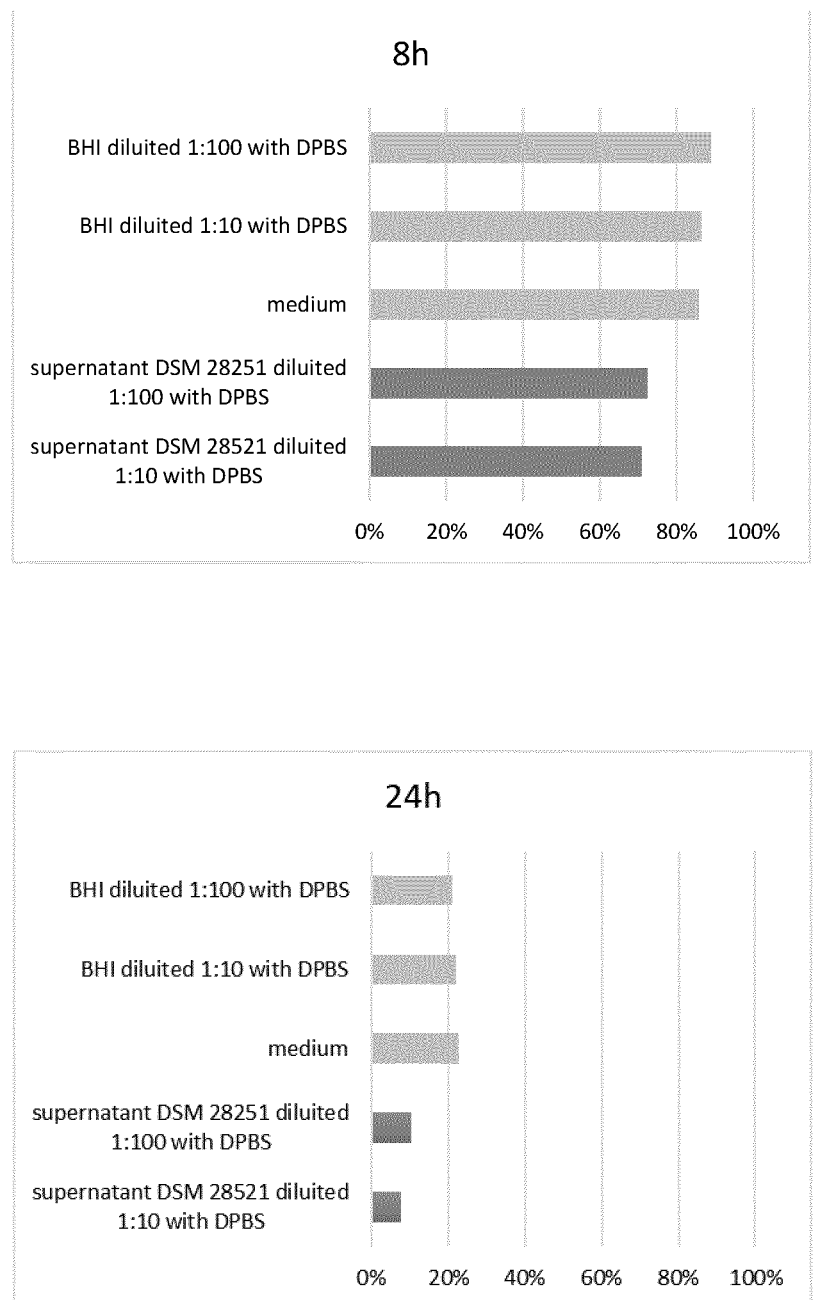
FIG. 1 shows bar graphs reporting the septum values of Example 1, calculated with the image j software.

In a first aspect, the invention concerns with a strain belonging to the genus *Cutibacterium* species *acnes*, filed with accession number DSM 28251 (ID 19-401) at the International Deposit Authority Leibniz-Institut DSMZ—Deutsche Sammlung von Mikroorganismen and Zellkulturen GmbH, or a variant essentially derived from said strain.

The invention also concerns with a postbiotic as defined in claims 2, 3 and a cell wall as defined in claim 4, 5.

The above bacterial strain is provided both with an anti-inflammatory activity in vivo and at least an antimicrobial activity in vitro. A cell wall or postbiotic from the above strain are provided with these activities as well.

The above activities are proven by the experimental tests carried out by the inventors and reported in the following examples. These tests provide a scientific basis for the use of the above-identified bacterial strain as anti-inflammatory, immunomodulatory and antimicrobial agents, especially for topical applications.

In certain aspects of the invention, a composition, especially a pharmaceutical o nutritional composition, containing a strain/wall or postbiotic as herein defined, is hereby provided.

In accordance to another aspect, the invention concerns with the use of the above identified strain/wall/postbiotic as a medicament and to medical uses thereof especially as defined in claims 9-13.

The intrinsic properties of the selected bacterial strain provides an anti-inflammatory action enabling the physician to treat a wide range of disease especially those localised on the skin or mucosa of the human body.

In addition, the antibacterial and/or bacteriostatic properties of the selected strain make it useful in the treatment of infections, especially skin and mucosal infections. The selected strain has proven to be effective against common bacteria, especially gram positive bacteria, especially cocci bacteria such as *Staphylococcus aureus*, or against *Escherichia coli* and fungi for example of the genus *Candida*.

The strain according to the present invention is genotypically characterized and is identifiable in a clear and defined manner by specific traits identified within the genome. This strain has evolved spontaneously, without any direct intervention or genetic manipulation, and has the relevant characteristics for industrial application. In order to verify and ascertain the characteristics of the DSM 28251 strain, and to rule out the possible overlap of this strain with the strains described in the prior art, a genotype characterization was made by DSMZ.

In an aspect the invention provided for the cosmetic use of a topical composition as defined in claims 7, 8 especially for the cosmetic treatment or prevention of sensitive skin, red skin, couperose, dry ski, in particular of the face of a human being.

In certain aspects the invention also concerns with a strain or wall or postbiotic of DSM 28251 *C. acnes* strain for medical uses in the treatment of:
- a gynecological disease such as vaginitis, vaginal infection or inflammation or
- a proctological disorder for example hemorrhoids, anal rhagades or skin scars or the perianal area or
- wounds, injuries, abrasion, ulcerations of the skin, for example pressure ulcers or to heal wounds.

Definitions in the Present Invention:

"Strain DSM 28251" is meant to include a bacterial strain of the genus *Cutibacterium*, species *acnes*, filed on 18 Dec. 2013 (identification reference ULTIMO) and converted to a deposit under the Budapest Treaty on 22 Dec. 2019 with accession number DSM 28251 at the International Deposit Authority Leibniz-Institut DSMZ-Deutsche Sammlung von Mikroorganismen and Zellkulturen GmbH. All restrictions upon availability of the deposit to the public will be irrevocably removed upon granting of the patent, and the deposit is intended to meet all of the requirements of the Budapest Treaty and 37 C.F.R. § 1.801-1.809. Applicant does not waive any infringement of their rights granted under this patent. Typically, *Cutibacterium acnes* is a gram-positive bacterium.

"genetic manipulation" is meant to include any technical intervention aimed at directing the process of acquisition of specific genetic characteristics which are expressed as corresponding phenotypic traits, where the technical interventions comprise (Sturley & Young, 1986): (i) crossing natural strains, followed by selection; (ii) production of hybrids followed by selection; (iii) transformation, i.e. insertion of exogenous DNA in chromosomes or in the mitochondrial genome, or other genetic elements such as plasmids. (iv) Induced random mutagenesis usually followed by selection and/or production of hybrids (Nevoigt 2008) can be added as further mode of manipulation;

"derived variant" is meant to include a variant of the strain of the strain *Cutibacterium acnes*, deposited at the DSMZ with accession number DSM 28251, which can be tracked back to it by microsatellite DNA profiling or because of a distinctive genetic trait detectable by genome sequencing and comparative analysis.

"growth medium" (synonyms: medium, growth medium/cultivation broth/growth broth) refers to a substrate containing all the compounds (factors) required by a microorganism, especially a bacterium such as a gram+ bacterium for the cell replication resulting in the increasing of the single cells number and growth of the population. The factors required by the microorganisms for their growth in the medium belong mainly to the categories: carbon source, similar nitrogen source (constituted both by ammonia and free amino acids, the last also known as FAN), vitamins and salts (trace elements). Typical carbon sources are sugarcane molasses, beet molasses, barley malt extract and wheat malt extract.

The composition of not vital cell/not viable cells, cell extracts, cell lysate is strictly linked to the unique metabolic and physiological properties of the DSM 28251 strain.

"Postbiotics" means non-viable bacterial products including metabolic by-products secreted by a microorganism such as the strain deposited at the DSMZ with accession number DSM 28251 that have biological activity in the host or when applied on a tissue of human body such as skin.

Postbiotics also comprises any materials of the *Cutibacterium* strain DSM 28251, advantageously including its wall, cytoplasm, cytoplasmatic membrane, genetic material (nucleoid), ribosomes which may be released or obtained after bacterial lysis. Postbiotics provide physiological benefits to the host and may be used to formulate a composition for medical or cosmetic uses and for oral and/or topical administration as herein described.

Postbotic of the *Cutibacterium* strain DSM 28251 may be obtained according a general procedure/process including the following steps:
the bacterial strain is grown in a medium or in a broth in order to obtain a suspension. The suspension is centrifuged in test tubes, by using conventional technology.

At the end of the centrifugation, a stratification of the suspension is obtained. A pellet containing the cells is deposited on the bottom of the test tube with an upper layer containing the supernatant, which is the liquid/culture medium.

The supernatant is then removed leaving the pellet deposited on the bottom of the test tube, which is collected and washed with water. The pellet is then resuspended in a physiological (saline) solution to obtain the cells and further centrifuged to remove the remaining culture medium. Cells suspended in water are mechanically treated with a mechanical stirrer, such as Ultratturrax (mechanical lysis).

With the mechanical lysis of the cell wall the cell content is released and the postbiotic (supernatant) is obtained.

Specific embodiments of this procedure are described in the following detailed description and Examples.

"carrier" refers to an excipient, vehicle, diluent or adjuvant, which may or may be present in the composition of the invention.

"nutritional product" means a product, which improves the nutritional status and may be used to support or improve the functional activity of one or more organs or the functionality of the human body within the physiological boundaries.

"selected bacterial strain" or "strain" as mentioned herein means the strain of the invention deposited at the DSMZ with accession number DSM 28251.

"cell wall" or "wall of the bacterial strain (of the invention)" means the cellular wall of bacterial strain *Cutibacterium acnes* deposited with accession number DSM 28251.

The wall of the strain of the invention may be disrupted into parts or fragments.

The term "fragment" means a part of the wall of the DSM 28251 strain of invention.

A fragment may also designate a cell lysate of the wall of the strain DSM 28251.

A fragment or lysate of cell wall of the DSM 28251 strain may be obtained by conventional or general methods of cell disruption, for example as disclosed hereinbelow:

Bacteria in broth or culture medium are washed and delipidated typically by using a soxhlet extractor. The delipidated bacteria are then suspended in water and then subjected to mechanical lysis for example with a mechanical stirrer, for example by using an Ultratturrax and the content is treated with ammonium sulphate to precipitate the fragments of the bacterial wall.

The fragments can then be cleaned for example by washing with water to obtain wall fragments.

A specific process for obtaining a wall fragment of the *C. acnes* strain DSM 28251 is described in Example 6.

A suitable destruction/disruption of the strain or its wall may be achieved either by subjecting the strain of the invention to mechanical methods/lysis treatments or non-mechanical methods/lysis treatments.

Strain Disruption with Mechanical Methods/Apparatus

Suitable mechanical methods for disrupting (lysis) the wall cell of the present strain and obtaining wall fragments include either solid shear or fluid shear methods.

Solid shear includes the use of bead mill, X-press or Hughes press.

Liquid shear includes sonication and high-pressure methods including Hughes press or the French press and/or the homogenization with a homogenizer or the use of a microfluider homogenizer.

The technique with bead mill (or abrasion) typically includes the agitation of a suspension of the strain with glass beads.

Typically, the disruption of the cell wall with a bead mill method is carried out in a bead mill which includes a jacketed grinding chamber with a rotating shaft running through its centre. The shaft is fitted with agitator(s) imparting the kinetic energy to beads in the chamber, forcing them to collide with each other (Chisti & Moo-Young, 1986; Middelberg, 1995). Suitable beads may be 0.10-0.15 mm in diameter for effective disruption of the bacteria. Large industrial apparatuses may use beads of in diameter because of the mechanism for separating the beads from the suspension (Kula & Shutte, 1987). Suitable tip speed is of at least 10 $m^{-1}$ for the disruption of the bacteria (Kula & Shutte, 1987). The cell concentrations may vary from 40-50% wet weight in the broth introduced into the chamber.

Suitable solid shears also comprise sonication and high-pressure methods including the Hughes press or the French press, in which a frozen suspension of cells is forced through a small opening by high pressures (Engler, 1985).

Sonication includes the use of ultrasound, sound waves typically with frequency higher than 15-20 kHz which can disruption cell wall in suspension. Suitable acoustic power for example, when sonicating 5-30 mL of a 20% bacterial suspension in a conventional liquid medium using 35-95 W of acoustic power.

Alternatively, mechanical disruption may be obtained in a high-pressure valve homogenizer by passing a cell suspension of the strain under high pressure through an adjustable, restricted orifice discharge valve as reported by Engler, 1985. Typically, a basic homogenizer design comprises a positive-displacement pump that forces a cell suspension through the centre of a valve seat and across the seat face. Adjusting the force on the valve controls the pressure. The fluid flows radially across the valve and strikes an impact ring (Middelberg, 1995). Disruption results from non-specific tearing apart of the cell wall.

Exemplary homogenizer type is the Manton-Gaulin APV design (Middelberg, 1995). For example, the temperature is raised of about 21 C per 10M Pa in a homogenizer. There is a strong influence of the operating pressure on the disruption process in the homogenizer. By operating the homogenizer at higher pressures, it is possible to decrease number of passes of the cell slurry through the homogenizer for a given degree of disruption (Chisti & Moo-Young, 1986; Bury et al., 2001).

A microfluider homogenizer may also be used as equipment for obtaining fragmented cell wall. In this apparatus two streams of a cell suspension are impacted at high velocity against a stationary surface and the energy input is dissipated almost instantaneously at the point of impact leading to disruption of cells (Middelberg, 1995; Agerkvist & Enfors, 1990). The residence time of the strain suspension in the Microfluidizers disruption chamber, which is the hottest part of the device, is 25-40 ms. Cooling in place ma be achieved by immersion of the disruption chamber in an ice bath (Sauer et al., 1989; Geciova, personal experience). The fraction of disrupted cells increases with increasing pressure and number of passes.

Strain Disruption with Non-Mechanical Methods

A non-mechanical method is based on decompression obtained by introducing a pressurized subcritical or supercritical gas into the cells causing disruption after release of applied pressure by expansion.

Another non mechanical disruption of the cell wall may be obtained by osmotic shock wherein a cell-strain suspension is diluted in a liquid medium/broth after equilibration in high osmotic pressure under conventional conditions.

An alternative method for cellular lysis is thermolysis which involves heat treatment of the cells under conventional conditions. Another non mechanical cell lysis may be obtained by chemical permeabilization especially with a substance selected from antibiotics such as beta lactam antibiotic for example penicillin, chelating agents for example EDTA, chaotropes for example urea, guanidine, ethanol, detergents for example Triton™ X series, sodium dodecyl sulphate, sodium lauryl sarcosinate, solvents such as toluene, acetone, chloroform, hydroxides such as sodium hydroxide, hypochlorites such as sodium hypochlorite and mixtures thereof.

Cellular lysis of the strain may also be obtained by enzymatic lysis for example by using a protease and glucanase to attack, at first, the mannoprotein complex of the cell wall and then the glucan backbone (Kitamura, 1982). A suitable product for the strain wall lysis is commercial product Zymolase-20T (Seikagaku America, Inc., Rockville, MD). Lysozyme may be also used for lysis of peptidoglycan layers as it catalyses hydrolysis of b-1,4-glycosidic bonds.

In accordance with a preferred embodiment a fragment of wall of *C. acnes* DSM 28251 strain may be obtained by treating the bacterial strain with ammonium sulphate, preferably at a temperature lower than room temperature for example in the range of 10 to 2° C., and advantageously after the treatment the suspension is centrifuged and the precipitated fragment is collected.

Advantageously, before the treatment with ammonium sulphate, the *C. acnes* DSM 28251 strain is dried and centrifuged optionally with water. Optionally, after centrifugation the supernatant resulting from centrifugation is heated for example at a temperature of 40 to 95° C., preferably at 75-85° C. and then cooled for example with cool water, preferably at 3 to 15° C. Thereafter, the precipitation step is performed incubating with a solution of ammonium sulphate at a concentration from 20 to 60% v/v for example at 2 to 10° C. Advantageously, after incubation the obtained suspension is centrifuged and the precipitated fragment may be collected. For example, the bacterial pellet is delipidated by Soxhlet treatment using organic solvents selected from Ether-Ethanol, Chloroform, Methanol-Chloroform and a mixture thereof, then it is dried for example under the hood laminar flow. After drying, the pellet is homogenized by 2 steps of Ultratturrax treatment, preferably 1 minute each, adding distilled water, preferably in the proportion of 1:2 p/V. After centrifugation, the supernatant is warmed at 80° C. and then cooled under cool water, preferably at 3 to 15° C., and finally on ice. Subsequently, the fragment precipitation step is performed by incubating with 40% v/v cool ammonium sulphate for 24 hours at 4° C. After incubation, the suspension is centrifuged, and the precipitated fragment was collected and lyophilized.

In some embodiments, the fragment of the cellular wall of *Cutibacterium acnes* deposited with accession number DSM 28251 is delipidated, i.e. treated so as either to remove or considerably reduce the lipid component of the cellular wall of the bacterium by means of chemical/biotech techniques. For example, the *Cutibacterium acnes* deposited with accession number DSM 28251 is delipidated prior to crushing to produce the cellular wall fragments. Typically, the delipidated fragments of cellular wall of the strain of the invention comprise sugars and peptidic chains, typically bound to one another into glycopeptides which form a close knit mesh. Typical sugars of the cellular wall comprise N-Acetylmuramic acid and N-Acetylglucosamine.

Pharmaceutical Compositions

The bacterial strain DSM 28251 and essentially derived strains thereof or a fragment or postbiotic resulting thereby prove to be extremely advantageous for industrial application in the preparation of pharmaceutical compositions, especially for topical application.

In accordance with an aspect, the present invention relates to a pharmaceutical composition comprising a bacterial strain as defined above fragment or postbiotic resulting thereby and a pharmaceutically or physiologically acceptable excipient.

The physiologically or pharmaceutically suitable carrier, diluent or excipient may be selected based on the route of administration for which the resulting pharmaceutical composition is intended.

The pharmaceutical compositions of the present invention encompass any compositions made by mixing a strain as herein defined, fragment thereof or postbiotic thereof according to the present invention and a pharmaceutically acceptable carrier. Such compositions are suitable for pharmaceutical use in an animal or human.

The pharmaceutical compositions of the present invention comprise a therapeutically effective amount of a strain as defined above or fragment/postbiotic thereof, and a pharmaceutically acceptable carrier.

A pharmaceutical composition may optionally contain other active ingredients. The term "carrier" refers to a vehicle, excipient, diluents, or adjuvant with which the therapeutic or active ingredient is administered. Any carrier and/or excipient suitable for the form of preparation desired for administration is contemplated for use with the strains/wall/postbiotic disclosed herein.

The carrier may take a wide variety of forms depending on the form of preparation desired for administration, e.g. oral or parenteral, including intravenous. In preparing the compositions for oral dosage form, any of the usual pharmaceutical media may be employed, such as, for example, water, glycols, oils, alcohols, flavouring agents, preservatives, colouring agents and the like in the case of oral liquid preparations, such as, for example, suspensions, elixirs and solutions; or carriers such as starches, sugars, microcrystalline cellulose, diluents, granulating agents, lubricants, binders, disintegrating agents, and the like in the case of oral solid preparations such as, for example, powders, hard and soft capsules and tablets, with the solid oral preparations being preferred over the liquid preparations.

In certain embodiments, the strain/wall/postbiotic of the present invention can be combined as an active ingredient in intimate admixture with a suitable pharmaceutical carrier and/or excipient according to conventional pharmaceutical compounding techniques.

The compositions include compositions suitable for parenteral, including subcutaneous, intramuscular, and intravenous, pulmonary, nasal, rectal, topical or oral administration. Suitable route of administration in any given case will depend in part on the nature and severity of the conditions being treated and on the nature of the active ingredient. An exemplary route of administration is the oral route. The compositions may be conveniently presented in unit dosage form and prepared by any of the methods well-known in the art of pharmacy. The preferred compositions include compositions suitable for oral, parenteral, topical, subcutaneous, or pulmonary, in the form of nasal or buccal inhalation, administration. The compositions may be prepared by any of the methods well-known in the art of pharmacy.

The pharmaceutical compositions may be in the form of tablets, pills, capsules, solutions, suspensions, emulsion, powders, suppository, and as sustained release formulations.

If desired, tablets may be coated by standard aqueous or non-aqueous techniques. In certain embodiments, such compositions and preparations can contain at least 0.1 percent of strain. The percentage of active strain/wall/postbiotic in these compositions may, of course, be varied and may conveniently be between about 0.1 percent to about 60 percent 0.5 to 20% of the weight of the unit. The amount of active strain/wall/postbiotic in such therapeutically useful compositions is such that therapeutically active dosage will be obtained. The strain/wall/postbiotic can also be administered intranasally as, for example, liquid drops or spray.

The tablets, pills, capsules, and the like may also contain a binder such as gum tragacanth, acacia, corn starch or gelatin; excipients such as dicalcium phosphate; a disintegrating agent such as corn starch, potato starch, alginic acid; a lubricant such as magnesium stearate; and a sweetening agent such as sucrose, lactose or saccharin. When a dosage unit form is a capsule, it may contain, in addition to materials of the above type, a liquid carrier such as a fatty oil. Various other materials may be present as coatings or to modify the physical form of the dosage unit. For instance, tablets may be coated with shellac, sugar or both. A syrup or elixir may contain, in addition to the active ingredient, sucrose as a sweetening agent, methyl and propylparabens as preservatives, a dye and a flavouring agent such as cherry or orange flavour. To prevent breakdown during transit through the upper portion of the gastrointestinal tract, the composition be an enteric coated formulation.

In the frame of the invention, the topical uses are preferred. Accordingly, in certain preferred embodiments, the composition is for the topical application. In this application, the composition containing strain/wall/postbiotic as defined herein may be applied on the skin of human beings.

Compositions for topical administration include, but are not limited to, ointments, creams, lotions, solutions, pastes, gels, sticks, liposomes, nanoparticles, patches, bandages and wound dressings. In certain embodiments, the topical formulation comprises a penetration enhancer.

Compositions for pulmonary administration include, but are not limited to, dry powder compositions consisting of the powder of a strain/fragment/postbiotic, and the powder of a suitable carrier and/or lubricant. The compositions for pulmonary administration can be inhaled from any suitable dry powder inhaler device known to a person skilled in the art.

Typically, the composition for topical use may contain an amount of the above identified bacterial strain from 0.00001% to 10%, from 0.0001 to 3%, from 0.1 to 2% weight with respect to the total weight of the composition.

The composition for topical application may be in solid, semisolid or fluid form. Suitable formulations in solid form include creams, gels, ointments, pastes, unguents, creams, patches.

The composition for local application in fluid form, may be in the form of lotions, gels, suspensions, emulsions.

In the case of fluid or semi-fluid formulations form, the bacterial strain can be diluted in a carrier in physiologically acceptable liquid form such as water, alcohol, hydroalcoholic or glyceryl solution or mixed with other liquids suitable for local application.

By way of an example, the compositions of the invention in liquid form can be prepared by dissolving or dispersing the bacterial strain or a byproduct thereof in water and/or alcohol. The liquid composition can be buffered to reach a pH range conveniently selected from 5 to 7 to be compatible with the pH of the skin and then filtered and packaged in suitable containers such as bottles or vials.

In one embodiment, the formulation for the local application is in the form of a cream or emulsion containing the bacterial strain carried in a suitable excipient.

According to other embodiments, the composition of the invention is in form for systemic administration in particular for oral administration. In these cases, the composition contains the bacterial strain as previously defined and one or more vehicles or excipients suitable for systemic administration.

Administration of the compositions is performed under a protocol and at a dosage sufficient to reduce the target disease in the subject.

In some embodiments, in the pharmaceutical compositions of the present invention the active principle or active principles are generally formulated in dosage units. The dosage unit may contain from 0.00001 to 1000 mg of a strain/wall/postbiotic per dosage unit for daily administration.

In some embodiments, the amounts effective for topical formulation will depend on the severity of the disease, disorder or condition, previous therapy, the individual's health status and response to the drug. In some embodiments, the dose is in the range from 0.001% by weight to about 60% by weight of the formulation.

When used in combination with one or more other active ingredients, the strain/wall/postbiotic of the present invention and the other active ingredient may be used in lower doses than when each is used singly.

With respect to formulations with respect to any variety of routes of administration, methods and formulations for the administration of drugs are disclosed in *Remington's Pharmaceutical Sciences*, $17^{th}$ Edition, Gennaro et al. Eds., Mack Publishing Co., 1985, and *Remington's Pharmaceutical Sciences*, Gennaro AR ed. $20^{th}$ Edition, 2000, Williams & Wilkins PA, USA, and *Remington: The Science and Practice of Pharmacy*, $21^{st}$ Edition, Lippincott Williams & Wilkins Eds., 2005; and in *Ansel's Pharmaceutical Dosage Forms and Drug Delivery Systems*, $8^{th}$ Edition, Lippincott Williams & Wilkins Eds., 2005, which are herein incorporated as reference.

In certain embodiments, the composition of the invention for oral administration is a nutritional or dietetic or nutraceutical product.

Examples of embodiments and preferred procedures of the present invention are described below to illustrate the invention.

Example 1

In vitro potential migration of human fibroblast cells stimulated with supernatant derived from a culture of bacterial strain Accession No. DSM 28251.
Aim of the Study
One of the mechanisms of action of the supernatant of a culture of bacterial strain Accession No. DSM 28251 is attributed to a postbiotic effect. The term post-biotic refers to metabolic by-products of microorganisms, especially bacteria and/or probiotics. Typically, postbiotics are produced by the metabolic activity or fermentative processes of bacteria such as probiotics (live microorganisms exerting beneficial effects for the hosts when administered at suitable amounts).

Postbiotics play extremely important roles in the regulation of health and the maintenance of a healthy microbiota.

One of the aims of this study is to evaluate the postbiotic effect on the migration of immortalized human skin fibroblast cells, to assess if with supernatant derived from a culture of bacterial strain Accession No. DSM 28251 promote the migration of this cells line.
Tested Samples
Supernatant derived from a culture of Bacteria strain with Accession No. DSM 28251.
Materials and Methods
Bacteria
Bacteria strain with Accession No. DSM 28251 of the invention was growth in brain hearth infusion broth (BHI) medium over night at 37c° and then to assess the post-biotic effect the supernatant from bacterial growth was centrifuged and subsequently filtered (0.45 µm) to remove the bacterial cells. Before use, an aliquot was plated on BHI Agar and incubated for 24 hours at 37° C. to verify the absence of microbial growth.
Cell Line
Nontumorigenic Human skin fibroblast cells were (maintained in 25 cm2 culture flasks in Dulbecco's modified Eagle medium (DMEM) supplemented with 1% of L-glutamine 200 mM, penicillin (100 U/mL), Streptomycin (100 µg/mL) and 10% of FBS. The cells, after washing with DPBS, were detached at room temperature with 0.25% trypsin-EDTA solution 1×, and the cells will be observed under an inverted microscope until cell layer will be dispersed (usually within 5 minutes). The cells were plated in µ-Dish (diameter 35 mm) containing the culture-insert (cod. 81176 Ibidi, Giemme, Italy). The culture-insert consists of two wells; when both wells are filled with adherent cells, a cell-free gap (channel) of approx. 500p m is created after removing the culture-insert. The cell suspension was prepared at the density of 3-7×105 cells/mL, applied in the two wells of culture insert (70 µL/well) and will be kept at 37° C. in 5% CO2 in DMEM supplemented with 1% of L-glutamine 200 mM, penicillin (100 U/mL), Streptomycin (100 µg/mL) and 10% FBS. After 24 hours of appropriate cell attachment, the culture-insert will be removed by using sterile tweezers and the µ-Dish was filled with medium (2 mL).

Cell Experiment for Migration Analysis

The cells were treated with supernatant, previously filtered, derived from a culture of Aileens bacteria diluted 1:10 and 1:100 with DPBS (Dulbecco's Phosphate-Buffered Saline). Furthermore, Fibroblast treated with BHI diluted 1:10 and 1:100 with DPBS have been used as control.

The cells will be maintained for a further 24 hours. The extent of cell migration will be photographed by Digital Microscope Eyepiece and measured using image analyzing software, Image J (V 1.45 s, provided by the National Institute of Health, USA). Each image will be subsequently transformed in negative by using a function of the software and then measured. The experiments was conducted in triplicate and the results expressed as a mean±SE. The Student T-test will be used for statistical significance. The values of p>0.05 will be considered statistically significant.

Results

Figure 2:
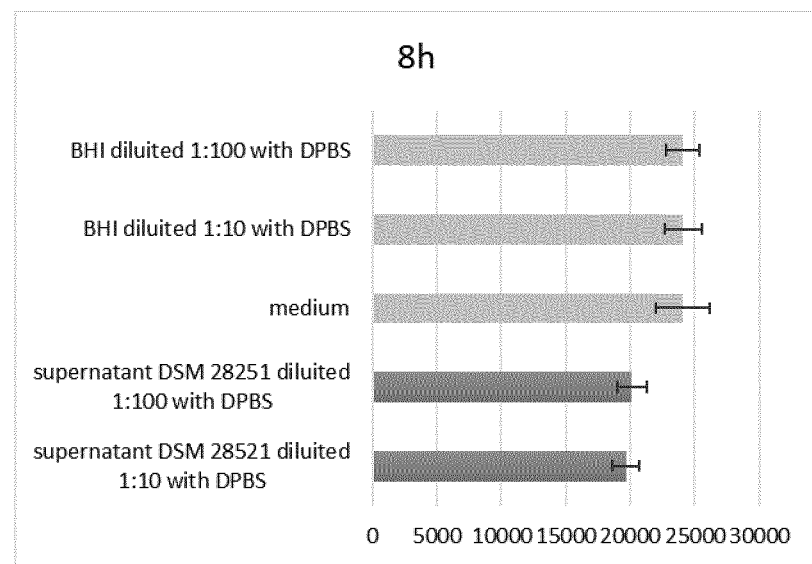
FIG. 2 shows bar graphs with the area of the septum of Example 1, calculated with the image j software.
Figure 2:
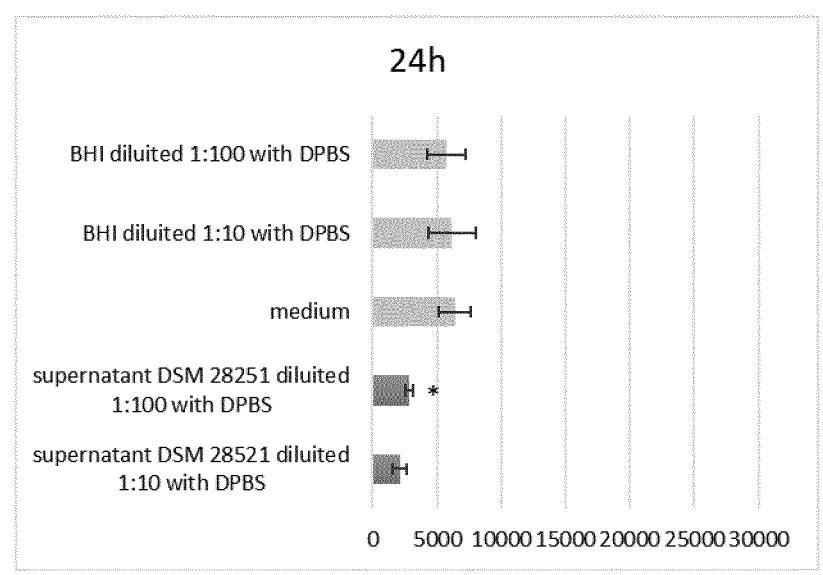

The results obtained show that bacterial strain Accession No. DSM 28251 supernatant diluted 1:10 and 1:100 with DPBS promotes cell migration (FIGS. 1 and 2). Furthermore, BHI diluted 1:10 and 1:100 with DPBS does not interfere with migration of fibroblast.

Example 2

Activity of heat-killed bacterial strain deposited under Accession No. DSM 28251 with DSMZ on human pathogen microorganism growth.

Material and Methods

The bacterial strain has been grown in Brain Heart infusion (BHI) medium o/n at 37° C. and then heat-killed at 60° C. for 1 hour.

Culture was washed with water to wash out the medium and the culture free of medium was diluted at $10^7$, $10^6$ and $10^5$ CFU/ml of both in Muller Hinton (MH) or Sabouraud medium. $10^5$ cells/ml inocula of *S. aureus* ATCC 29213, and *E. coli* ATCC 11775 were grown in triplicates in the final volume of 150 ul of each Muller Hinton diluition of the heat-killed culture in a 96 well plate. Similarly, $10^5$ cells/ml inocula of *C. albicans* were cultivated in triplicates in $10^7$, $10^6$ and $10^5$ Sabouraud dilutions of the killed bacterial culture. As controls, triplicates of all dilutions in both media were produced, as well as controls for strains growth were produced with $10^5$ cells/ml inocula of *S. aureus* and *E. coli* and *C. albicans* strains in the final volume of 150 ul of Muller Hinton and Sabouraud medium respectively. The Optical Density (O.D.) at the wavelength of 600 nm was measured for each well before (T0) and after 3, 6, 20 and 24 hours (T3, T6, T20, T24) of incubation at 37° C. The growth as the O.D. values trend observed for each strain in the medium added by heat-killed strain was compared to the one in Muller Hinton or Sabouroaud medium only.

The ability of the bacterial strain Accession No. DSM 28251 in interfering or inhibiting the microbial growth of bacteria and fungi commonly found in human skin (see Bacterial strains tested) was tested with a spectrophotometric method described by Hall et. al.

Microbial growth inhibition was evaluated in 96-well polystyrene plates. The serial dilutions of the tindalized mixture ($10^7$ to $10^5$ CFU/ml) were inoculated with the tested microorganisms, together with microorganisms alone (control) and medium (blank). All microbial strains were tested according to CLSI (Clinical Standard Laboratory Institute), guidelines [3,4].

At defined intervals (3, 6, 20 and 24 hours i) a spectrophotometric reading was performed at 600 nm. Results were provided as growth curves (microorganism alone), and inhibition curves (microorganism and tindalized concentrations). Each experiment was conducted in eight-fold and repeated three times, the results were expressed as mean±SD.

Bacterial Strains Tested:
*Staphylococcus aureus*
*Candida albicans*
*Escherichia coli*

Figure 3:
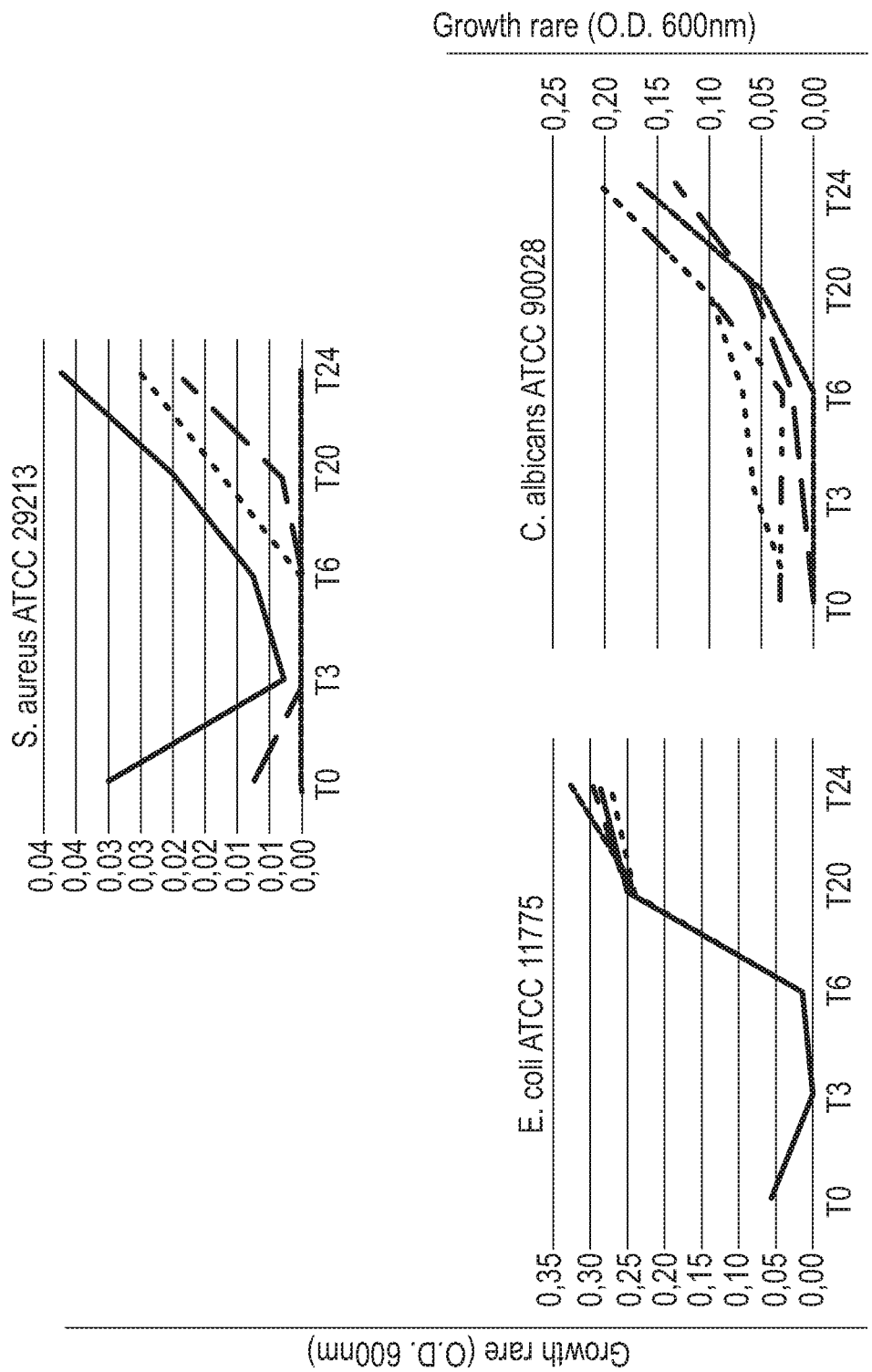
FIG. 3 shows bar graphs illustrating the in vitro effects on the growth curve of *S. aureus, E. coli* end *C. albicans* by adding into the culture mediums different concentration of the heat-killed *C. acnes* DSM 28251.
Figure 4:
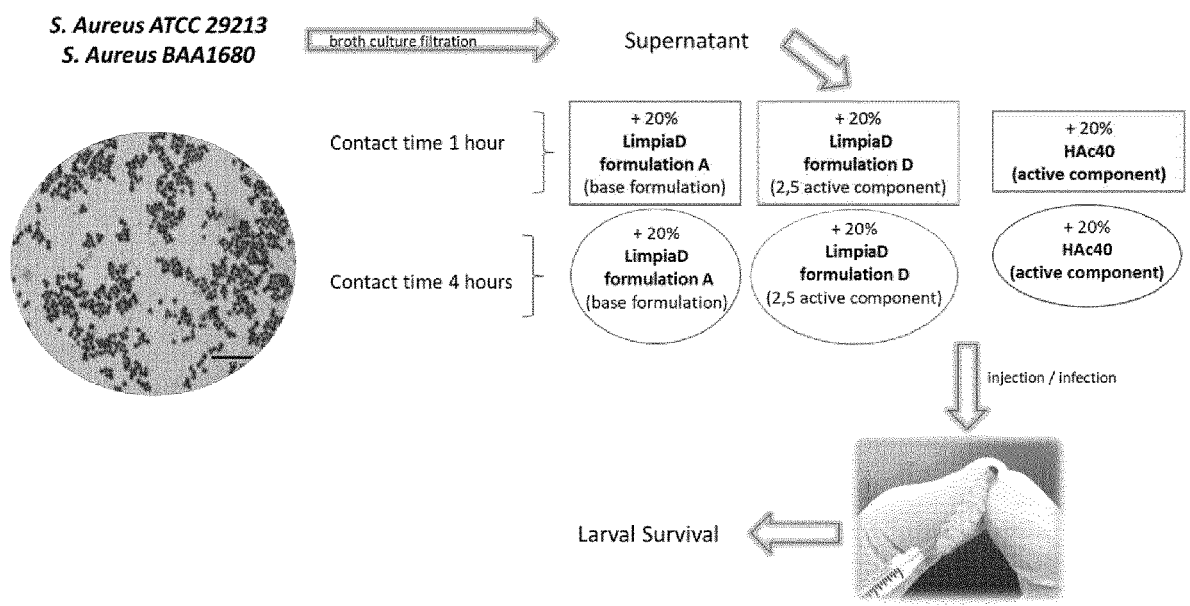
FIG. 4 illustrates the preparation of the supernatant and of the *Staphylococcus aureus* used in the test of Example 3.

The results are reported in appended FIG. 3.

As evidenced in FIG. 3, the addition of the bacterial strain Accession No. DSM 28251 of invention to the *S aureus* cultures slow down in a dependent dose the logaritmic phase of growth.

Similar results are found with *C. albicans*.

These experimental data support a inhibitory effect for the bacterial strain Accession No. DSM 28251 according to the invention.

Comparative test with the culture medium alone (i. e. without the 28251 strain).

Example 3

Tests with Formulations Containing the Strain DSM 28251 of the Invention on the Growth of *C. albicans*

Material and Methods

Tested Formulations

A) a base formula (free of strain DSM 28251)
B) a formula with 1% strain DSM 28251
C) a formula with 2.5% strain DSM 28251
D) a formula with 2.5% strain DSM 28251 (2×C40)

The base formula of the formulation contains water, caprylic/capryc trigliceride, glycerin butyrospermum parkii butter.

Procedure

Each formulation was included into the agar medium (20%) in 4-sector plates. The 4 sectors were used to plate different the fungal dilutions (10-5 10-8 CFU/ml), the same dilutions were plated on media without formulations, as a control. After inoculation, the plates with the formulation were incubated at 37° for 48 hours. Fungal growth in the media with formulations was checked against the control. Moreover, the pH of medium alone and formulas/medium were recorded, in order to verify a possible interference with the virulence state to that of non-virulence transition of *C. albicans*.

Results

On the control, an evident formation of numerous colonies with the typical white and cloudy morphology (2×109 CFU/ml) was observed.

From the microscopic findings, we observe the characteristic cellular morphologies of the pathogenic microorganism with the production of fungal hyphae.

For all the formulations tested, we observe the formation of an opaque patina with the failed formation of hyphae, two characters that are associated with the transition of the pathogen from the virulence state to that of non-virulence.

Moreover, the pH of the culture medium alone (S) is similar to the formulas pH media; therefore, the pH change does not seem to be involved in the phenotypical switch.

Conclusions

In *C. albicans*, a variation in the morphology of the colonies was observed: in the absence of the formulations, the typical colonies with a milky appearance were observed, while in the presence of the formulations, a homogeneous and translucent patina was obtained. This variation was also confirmed at the microscopic level, without the formulations the micro-organism was observed both as yeast and as mold (presence of hyphae), while in the presence of the formulas only as yeast.

This observation is an evidence of the inhibitory activity on the growth of *Candida albicans* of the formulations containing the selected strain of the invention.

Example 4

Inhibitory Action of a Formulation Containing the Strain DSM 28251 (LimpiAD) Against Toxins/Catabolites Produced by *S. aureus*: *Galleria Mellonella* In Vivo Test and Genes Expression Assay Introduction The potential action of the formula and the active principle as agents capable of reducing the effects of *S. aureus* toxins on a specific biological target was tested. *S. aureus* is one of the microorganisms most known in the etiology and development of atopic dermatitis. One of its main pathogenesis mechanisms is the production of a wide range of toxins.

The tested LimpiAD formula contains water, caprylic/capryc trigliceride, glycerin butyrospermum parkii butter.

For this purpose, an in vivo assay using *Galleria mellonella* larvae was performed. The greater wax moth *Galleria mellonella* (*G. mellonella*) is a model organism that is already validated for bacterial infection experiments and for pharmacological toxicity tests. It represents an essential tool for the preliminary screening of new compounds and a rapid and reliable evaluation of the potential inhibitory activity and thus should reduce the number of experiments needed using mammalian models [6].

The larvae of *G. mellonella* give multiple options for easy delivery of the pathogen, such as topical application, oral delivery, and injection. The microorganism can be injected directly into the larval hemocoel and therefore, larvae receive a known amount of pathogens.

Another advantage of the *G. mellonella* model is the possibility to assess the expression of genes related to immunity and stress. Thereby, to investigate the action of the device on *G. mellonella* larvae inoculated with the supernatant of *S aureus*, we have conducted qPCR assay to evaluate the effect of LimpiAD on the immunity and stress genes of *G. mellonella*. We have selected genes that play a crucial role in insect immunity responses to infection: phagocytosis, cytokines regulation, cell adhesion and metalloproteinase inhibitor.

Material and Methods

Microbial Strains Tested and Culture Conditions

*Staphylococcus aureus* ATCC BAA1680 and *Staphylococcus aureus* ATCC 29213 was grown in Brain Hearth infusion broth and incubating in thermally conditions at 37° C. overnight.

Supernatants preparation: the overnight cultures of both *Staphylococcus* strains were centrifuged at 5000 rpm for 5 minutes. The residual bacterial cells were removed by filter sterilization (0.22 μm) and diluted in saline solution in a ratio (1:2).

The diluted supernatants were mixed (1:5 w/v) with three different formulations (Table 1):

LimpiAD A (base formula, without active component);

LimpiAD D (with 2.5% active component);

active component alone.

After 1 h and 4 h incubation of formulations, the supernatants were recovered by centrifugation and used to inoculate *Galleria mellonella* larvae. Larvae treated injected with supernatants (without formulation) and culture medium alone (BrainHearth Infusion broth) in a 1:2 ratio were used as controls (FIG. 25).

To assess larvae survival *G. mellonella* larvae infection: the larvae were selected on the basis of weight and size and divided into the experimental groups listed in Table 1. Larvae were inoculated by injection using a repeating dispenser fitted with an insulin syringe (BD, Wellington) and a 1 mL ultra-fine needle through the larvae the last proleg. After inoculation, larvae for each condition were incubated in a Petri dishes at 35° C. and survival was observed in the following 96 hours.

TABLE N. 1

Tested substances and the number of injected *G. mellonella* larvae for each group.

| Substances tested | No Larvae |
|---|---|
| Supernatant ATCC BAA1680/29213 + LimpiAD A (1 h) | 20 |
| Supernatant ATCC BAA1680/ATCC 29213 + LimpiAD A (4 h) | 20 |
| Supernatant ATCC BAA1680/ATCC 29213 + LimpiAD D (1 h) | 20 |
| Supernatant ATCC BAA1680/ATCC 29213 + LimpiAD D (4 h) | 20 |
| Supernatant ATCC BAA1680/ATCC 29213 + active component (1 h) | 20 |
| Supernatant ATCC BAA1680/ATCC 29213 + active component (4 h) | 20 |
| Positive CNTR supernatant ATCC BAA1680/ATCC 29213 1:2 | 20 |
| Negative CNTR (BHI) 1:2 | 20 |
| Saline | 20 |

Gene Expression Essay: qPCR

Three survival larvae for each group (Control, saline solution; Infected, supernatant ATCC BAA1680, Treated with supernatant ATCC BAA1680 *S aureus*) were recovered at 96 h after the treatment. RNA was extracted in TRI Reagent (Sigma Aldrich) following the manufacturer's protocol RNA extracts were quantified spectrophotometrically then reverse transcribed to cDNA using a ReadyScript™ cDNA synthetis mix (Sigma Aldrich)

Primers name functions and sequences used in gene expression are listed in Table 2. Gene expression folds relative to a reference gene EF1, were determinated in the normalized samples by Rotor-Gene Q—QIAGEN, with PowerSYBR® (AppliedBiosystems). Cycling conditions were 95° C. 5 min then 42 cycles of: 95° C. 5 sec, annealing 10 secs, 72° C. 20 sec. An initial touchdown of 1° C. per cycle from 65° C. for the first 5 cycles, resulted in optimal amplification for all loci. All experiments were performed in triplicates for three different measurements [7].

TABLE 2

Primers used to analyse gene expression in Galleria mellonella larvae

| Primer | Process | function | Forward primer | Reverse primer |
|---|---|---|---|---|
| EF1 | Elongation factor 1-Alpha | housekeeping | AACCTCCTTACAGTGAATCC (SEQ ID NO: 1) | ATGTTATCTCCGTGCC AG (SEQ ID NO: 2) |
| Impi | Metalloproteinase | Target gene | TAGTAAGCAGTAGCATAGTCC (SEQ ID NO: 3) | GCCATCTTCACAGTAG CA (SEQ ID NO: 4) |
| Glut | Response to oxidative stress, | Target gene | CCACACTGTGAGGCAACATT (SEQ ID NO: 5) | GTTTGCTTAGCACGGT CACA (SEQ ID NO: 6) |
| Cytk | Regulation of cytokines | Target gene | CGAGCTAAAGACAGGCGATT (SEQ ID NO: 7) | TCACCTGCGGTTGAAT CATA (SEQ ID NO: 8) |
| Phag | Phagocytosis | Target gene | ATTGCTAGCCAGGTTCAGGA (SEQ ID NO: 9) | AGCTATTTGGCGGAAA CTCA (SEQ ID NO: 10) |

The preparation of the supernatant and the *S. aureus* used in the test are illustrated in FIG. 5.

Larvae Survival

In comparison to the control groups, the supernatants that had been pre-incubated for one hour with the test formulas was far less lethal.

Thus the increase of larvae survival *S. aureus* ATCC BAA1680 has ascribed the action of the active components.

Similarly, after 4 h of incubation, the activity of base formula A was confirmed at a lesser level, whereas the formula D confirmed the greater larvae survival.

Regarding the strain *S. aureus* ATCC 29213, also the lower activity was confirmed for the base formula A respect to the other tested formulas. In this case, the active components produced the greater increasing of larvae survival respect to the formula D both in 1 h and in 4 h pre-treatments.

Altogether these results suggested that the active components could interfere with pathogenesis associated to the toxins/catabolites produced by *S. aureus* ATCC BAA1680. Moreover, the action could be appreciated already after 1 h of incubation for both strains as well as for the strain *S. aureus* ATCC 29213 the intensity of interference resulted higher as more prolonged is the putative interaction with the toxins/catabolites in supernatants (FIG. 27-28).

Conversely, the 18-wheeler gene was hypo-expressed (99.98%) in the infected group compared to the treated group. LimpiAD preincubation, therefore significantly increased the expression of this gene involved in cell adhesion and migration.

Genes Expression Assay

Figure 7:
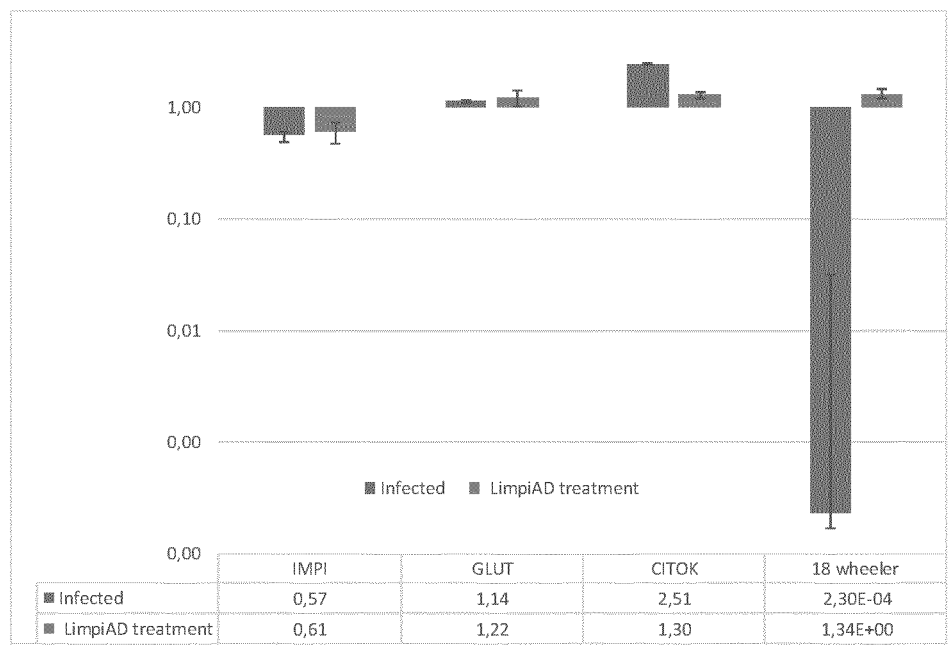
FIG. 7 shows the expression of target genes "normalized" at control, expressed as fold increases or decreases as reported in Example 4.

The expression of the two genes related to metabolic stress IMPI and GLUT was not significantly altered compared to control in both groups, as evidenced in FIG. 7. Therefore, LimpiAD does not alter the expression of these genes. The expression of the two genes related to innate immunity was differently expressed in the infected group than in the treated group. The CITOK gene regulating inflammatory cytokines (NF-kappa B cascade) were over-expressed (93.8%) in the infected group compared to the treated group. LimpiAD, therefore, reduced the expression of pro-inflammatory cytokines.

TABLE 3

*G. mellonalla*'s gene expression following treatment with LimpiAD/infected

| GENE | % of expression Treated/infected | Exspression |
|---|---|---|
| IMPI | 6.56% | Ipo-expressed |
| GLUT | 6.56% | Over-expressed |
| CITOK | 93.08% | Ipo-expressed |
| 18 wheeler | 99.08 | Ipo-expressed |

Conclusion

Infections with pathogenic strains of *Staphylococcus aureus* are considered a harmful factor in Atopic Dermatitis since these microorganisms, producing catabolites, stimulate the issuing of inflammatory cytokines and contributing to the damage of the epidermal barrier and the manifestation of the characteristic symptoms of the disease.

The results obtained suggest that LimpiAD components reduce the effect of catabolites produced by *S. aureus* on the survival of injected *G. mellonella* larvae.

Furthermore, treatment with LimpiAD reduced the expression of pro-inflammatory cytokines and increased the expression of the 18-wealer gene involved in cell adhesion and migration. Data obtained from the expression of metabolic stress and immunity genes provide further evidence on the mechanism of action of the LimpiAD. device.

Example 5

Comparative In Vitro Test

A comparative test with tyndallized *C. acnes* DSM 28251 versus other *cutibacterium* strains on the growth of pathogen microorganism of the skin.

Aim of the Test

The inhibitory activity of heat-killed bacteria of *C. acnes* strain DSM 28251 on bacteria colonizing the skin was compared with the activity of four different strains of the same species (*Cutibacterium* strains with same peptidoglycan composition) and a *C. granulosum* strain which are very close from an evolutionary point of view (phylogenetic proximity).

The aim of this study was to assess whether the strain *C. acnes* DSM 28251 has peculiar or improved properties compared to other species with phylogenetic proximity.

To this end, four strains of *Cutibacterium* spp. (three *Cutibacterium acnes* and one *Cutibacterium granulosum*)

differing from the DSM 28251 strain, either by phylotype or phylogenetic distance, have been chosen and tested (tested strain).

In the study have been also included two strains of *C. acnes* (DSM 30738 and 30753) the characteristics of which are not known, although they belong to the same species as strain DSM 28251 of this invention.

| TESTED STRAINS (*Cutibacterium* genus) | | | |
|---|---|---|---|
| *Cutibacterium* spp. C. acnes DSM 28251 | Pepdidoglycan composition (murein type) A3γ LL-Dpm-Gly | Phylotype I | Phylogenetic distance from *C. acnes* DSM 28251 (% 16S rDNA homology) |
| 1. *C. acnes* ATCC 11828 | A3γ LL-Dpm-Gly | II | 99.9% |
| 2. *C. granulosum* DSM 20458 ATCC 11829 | A3γ LL-Dpm-Gly | NA* | 94.0% |
| 3. *C. acnes* DSM 1897 | A3γ LL-Dpm-Gly | I | 99.9% |
| 4. *C. acnes* DSM 16379 | A3γ LL-Dpm-Gly | I | 99.9% |
| 5. *C. acnes* DSM 30738 | NAv* | NAv* | NAv* |
| 6. *C. acnes* DSM 30753 | NAv* | NAv* | NAv* |

NA*: not assigned. The philotypes classification is available only for the *C. acnes* strains.
NAv *: not available.

Pathogen Microrganisms of the Skin

The inhibitory activity of the above six *Cutibacterium* strains has been tested against the following five microorganisms which are well-known and widely represented skin pathogens:

*S. aureus* ATCC 29213

*S. aureus* ATCC BAA-1680

*S. aureus* DSM 20491

*S. epidermidis* ATCC 12228

*Candida albicans* ATCC 90028

Material and Methods

Preparation of the Heat-Killed Bacteria (*Cutibacterium*)

The tested *Cutibacterium* were killed by tindalization (fractional sterilization).

All *Cutibacterium* strains were grown in BHI (Brain Heart Infusion) broth with 20% supplementation at a temperature of 37° C. until the maximum exponential phase of growth verified by spectrophotometric reading (O.D. 600 nm). Subsequently, the medium was removed by centrifugation and processed for supernatant testing. The bacterial pellet was washed in saline solution (NaCl 0.9%) until complete removal of any residual supernatant and then diluted to a concentration of 0.5 McFarland ($1.5\times10^8$ CFU/ml).

The titrated inoculum was subjected to tindalization.

The tindalization process involved heating at 80° C. for 30 minutes to kill the vegetative forms, followed by an incubation period at 37° C. for 24 hours to promote germination of the remaining vegetative cells not killed by the heat treatment, then the material was again brought back to 80° C. for 30 minutes. The entire thermal cycle was repeated 3 times. An aliquot of the tindalized material was seeded on Columbia Blood Agar and incubated at 37° C. in aerobiosis for 24 hours to verify the absence of microbial growth and the correct implementation of the process. Tindalized bacterial cells have an inactivated replication and enzymatic capacity while maintaining their cellular structure and wall, therefore physiologically intact and, for this reason, immunologically active.

Assessment of the Activity of Killed Strains on the Pathogenic Microorganism Growth The ability of the heat-killed *C. acnes* strains to interfere and/or inhibit with/on the growth of the tested *Staphylococcus* strains and a *C. albicans* strain was evaluated using a spectrophotometric method.

The heat killed strains were tested using the same growth medium (BHI broth, supplemented of 20% in concentration) through the following procedure:

The heat-killed bacteria were previous diluted to the final concentration of $10^5$ CFU/ml and then inoculated with the pathogenic microorganisms of the skin as follows.

In triplicate, 100 ul of active cultures of tested strains *S. aureus* ATCC® BAA-1680™ *S. aureus* DSM 20491, *S. aureus* ATCC® 29213™, *S. epidermidis* ATCC® 12228™ and *C. albicans* ATCC® 90028 ™ were inoculated into the wells of each fragment. Each bacterial strain was previously grown in BHI medium at 37° C. until the exponential growth stage and the cells collected through centrifugation at 3000 rpm for 5 minutes. The pellet was resuspended in fresh BHI medium to obtain suspensions with a concentration of $1\times10^5$ CFU/ml.

These suspensions were used as inocula into the wells of 96 well plate.

The 96 well plates were prepared in triplicates, each with experimental controls, i.e. strains inoculum alone without any added fragment, and the "blanks" of experiment (BHI medium with each fragment) for the spectrophotometric calibration.

The Optical Density at 600 nm (O.D. 600 nm) was measured using VICTOR Multilabel Plate Reader (PerkinElmer) system and it was considered as the growth value at time zero (T0) for each strain and treatment. Subsequent measurements were performed after 2, 4, 6, 8, 18, 20, 22 e 24 hours during the incubation period. The O.D. values were normalized against blanks and controls and then analyzed to evaluate the growth trend of the different germs with/without (CTR) the wall fragments. The results were reported as mean value±S.D. (Standard Deviation), and the growth curves were obtained by non-linear regression analysis using a Sigmoidal function suitable for bacterial growth. The analyzes were performed with the software GraphPad Prism version 7.0a.

Results

Figure 9:
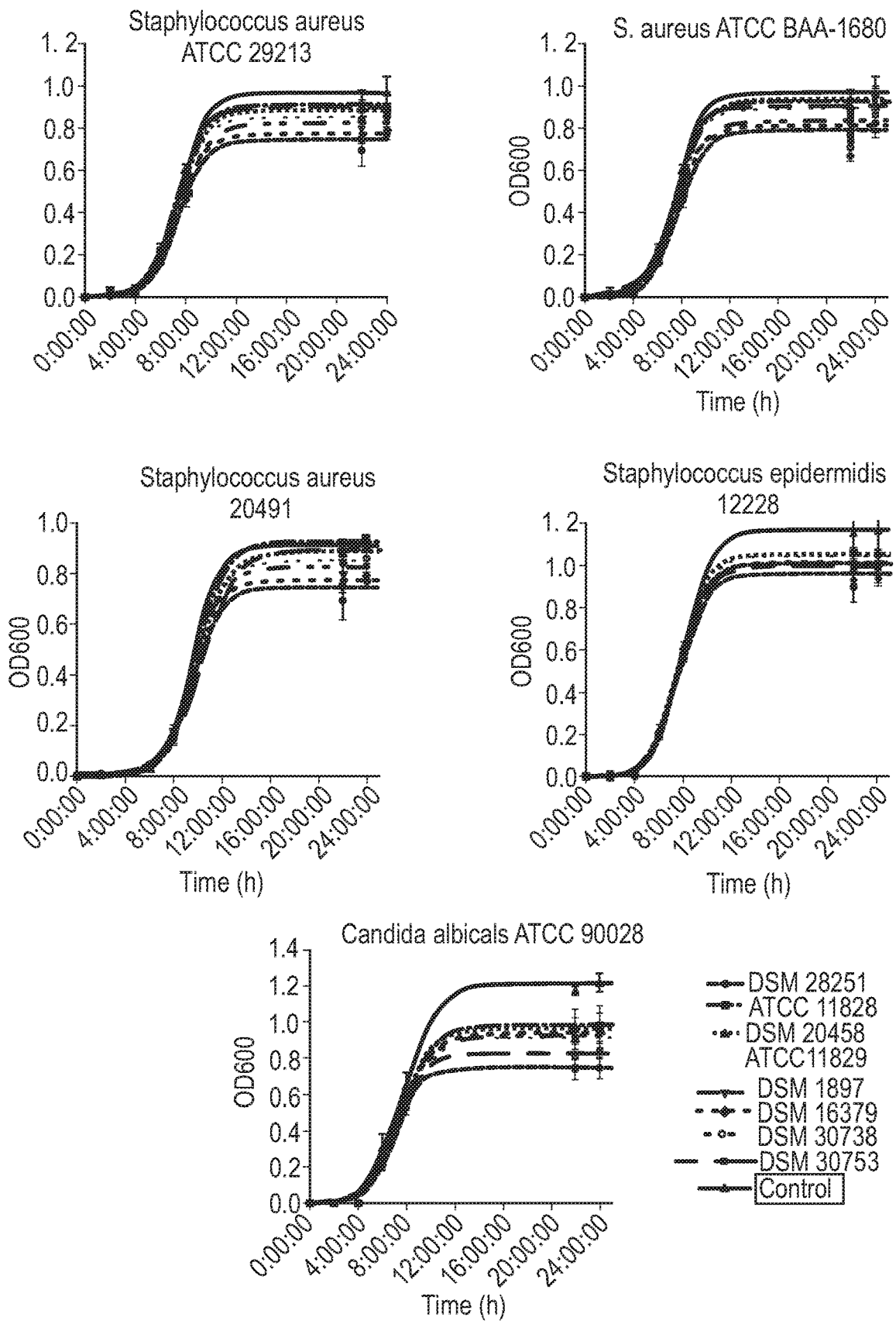
FIG. 9 shows five graphs each illustrating comparatives growth curves of three strains of *Staphylococcus aureus*, one strain of *Staphylococcus epidermidis* and one strain of *Candida albicans* each in a medium inoculated with seven different heat-killed known strains of *Cutibacterium acnes* and with the strain *Cutibacterium acnes* DSM 28251 (comparative heat-killed strain)

Growth curves of the pathogenic microorganism of the skin in the presence and absence (control) of the Heat-Killed bacteria of the *Cutibacterium* strains are shown in FIG. 9. A first AUC qualitative evaluation shows that heat-killed *C. acnes* DSM 28251 has an improved inhibitory effect on microbial growth for all the tested pathogenic microorganism of the skin.

The following Table 2a reports a quantitative evaluation of the AUC for each derivative against all microorganism tested. These values confirm what is shown in FIG. 9 wherein the Heat-Killed bacteria obtained from *C. acnes* DSM 28251 show a remarkable influence/inhibitory activity on the growth of all the tested skin microorganism.

TABLE 2a

Values of Area Under the curve (AUC) and relative Standard Errors (light blue) of growth curves showed in FIG. 2 with/without (control) heat-killed bacteria. The color scale for each strain indicates the range of AUC values: from minor (dark red) to major (dark green) AUC value.

|  |  | DSM 28251 | ATCC 11828 | DSM 20458 ATCC 11829 | DSM 1897 | DSM 16379 | DSM 30738 | DSM 30753 | Control |
|---|---|---|---|---|---|---|---|---|---|
| S. aureus ATCC 29213 | Total Area | 11.92 | 15.18 | 14.54 | 13.26 | 13.02 | 14.11 | 14.72 | 15.55 |
|  | Std. Error | 0.61 | 0.25 | 0.18 | 0.28 | 0.27 | 0.33 | 0.13 | 0.57 |
| S. aureus ATCC BAA-1680 | Total Area | 12.38 | 15.15 | 15.01 | 13.39 | 12.71 | 13.40 | 14.54 | 15.55 |
|  | Std. Error | 0.40 | 0.52 | 0.42 | 0.39 | 0.31 | 0.48 | 0.54 | 0.58 |
| S. aureus DSM 20491 | Total Area | 9.16 | 11.33 | 10.86 | 10.15 | 9.55 | 10.86 | 11.04 | 11.38 |
|  | Std. Error | 0.56 | 0.23 | 0.14 | 0.25 | 0.16 | 0.32 | 0.19 | 0.25 |
| S. epidermidis ATCC 1228 | Total Area | 14.83 | 16.37 | 16.67 | 15.58 | 15.20 | 15.88 | 15.60 | 17.62 |
|  | Std. Error | 0.55 | 0.18 | 0.34 | 0.51 | 0.24 | 0.11 | 0.44 | 0.98 |
| C. albicans ATCC 90028 | Total Area | 12.94 | 15.24 | 15.66 | 14.87 | 15.12 | 14.98 | 13.81 | 18.81 |
|  | Std. Error | 0.60 | 0.47 | 0.89 | 0.21 | 0.36 | 0.21 | 0.35 | 0.58 |

The percentage reduction in growth compared to control conditions is shown in the following Table 2b. These data confirm the results discussed above, highlighting the improved activity of the C. acnes DSM 28251 heat-killed versus the common C. acnes strains.

TABLE 2b

Growth decreasing percentage respect to the control condition (without heat-killed bacteria inocula). The color scale for each strain indicates the range of decrease: from major (dark red) to minor (dark green) growth decrease (%).

|  | DSM 28251 | ATCC 11828 | DSM 20458 ATCC 11829 | DSM 1897 | DSM 16379 | DSM 30738 | DSM 30753 |
|---|---|---|---|---|---|---|---|
| S. aureus ATCC 29213 | 23.344 | 2.379 | 6.495 | 14.727 | 16.270 | 9.260 | 5.338 |
| S. aureus ATCC BAA-1680 | 20.386 | 2.572 | 3.473 | 13.891 | 18.264 | 13.826 | 6.495 |
| S. aureus DSM 20491 | 19.135 | 0.439 | 4.148 | 10.415 | 15.719 | 4.148 | 2.560 |
| S. epidermidis ATCC 1228 | 15.834 | 7.094 | 5.392 | 11.578 | 13.734 | 9.875 | 11.464 |
| C. albicans ATCC 90028 | 31.207 | 18.979 | 16.746 | 20.946 | 19.617 | 20.362 | 26.582 |

Example 6

The comparative test of Example 5 was repeated using postbiotics/supernatants of all the strains of C. acnes (instead of heat-killed strains of Example 5).

Aim of the Test

The inhibitory activity of postbiotics/supernatants obtained from the same six Cutibacterium strains of Example 5 on the same pathogenic microorganisms of the skin of Example 5 was compared.

The aim of this study was to assess whether a postbiotic from strain C. acnes DSM 28251 has an improved inhibitory activity on pathogenic microorganism of skin compared to postbiotics from the C acnes species of Example 5.

Material and Methods

Preparation of the Postbiotic of C. Acnes DSM 28251.

Bacterial supernatants previously obtained from Cutibacterium strains were subjected to filtration (0.22 µm filters) to remove any cellular residues; sterility was confirmed by the absence of bacterial growth after inoculation on Columbia Blood Agar and incubation at 37° C. in aerobiosis for 24 hours of an aliquot of each supernatant under investigation.

In order to exclude any interference due to the production of acidic substances typical of some strains of Cutibacterium spp., the pH of each supernatant was carefully measured and, if necessary, neutralized with a 1M sodium hydroxide solution.

Spectrophotometric assessment of the activity of postbiotics on the pathogenic microorganism growth.

The ability of the postbiotic originating from C. acnes strains referred in Example 5 to interfere and/or inhibit with/on the growth of the same Staphylococcus strains and a *C. albicans* strain reported in Example 5 was evaluated using a spectrophotometric method.

The postbiotics were tested using the same growth medium of Example 5 (BHI broth, supplemented of 20% in concentration) through the following procedure:

The supernatants were diluted in a 1:10 proportion in BHI broth and then incubated with tested skin microorganisms.

In triplicate, 100 ul of active cultures of skin pathogenic microorganisms *S. aureus* ATCC® BAA-1680 ™, *S. aureus* DSM 20491, *S. aureus* ATCC® 29213 ™, *S. epidermidis* ATCC® 12228 ™ and *C. albicans* ATCC® 90028 ™ were inoculated into the wells. Each bacterial strain was previously grown in BHI medium at 37° C. until the exponential growth stage and the cells collected through centrifugation at 3000 rpm for 5 minutes. The pellet was resuspended in fresh BHI medium to obtain suspensions with a concentration of $1 \times 10^5$ CFU/ml.

These suspensions were used as inocula into the wells of 96 well plate.

The 96 well plates were prepared in triplicates, each with experimental controls, i.e. strains inoculum alone, and the "blanks" of experiment (BHI medium with each fragment) for the spectrophotometric calibration.

The Optical Density at 600 nm (O.D. 600 nm) was measured using VICTOR Multilabel Plate Reader (PerkinElmer) system and it was considered as the growth value at time zero (T0) for each strain and treatment. Subsequent measurements were performed after 2, 4, 6, 8, 18, 20, 22 e 24 hours during the incubation period. The O.D. values were normalized against blanks and controls and then analyzed to evaluate the growth trend of the different germs with/without (CTR) the wall fragments. The results were reported as mean value±S.D. (Standard Deviation), and the growth curves were obtained by non-linear regression analysis using a Sigmoidal function suitable for bacterial growth. The analyzes were performed with the software GraphPad Prism version 7.0a.

Results

Figure 8:
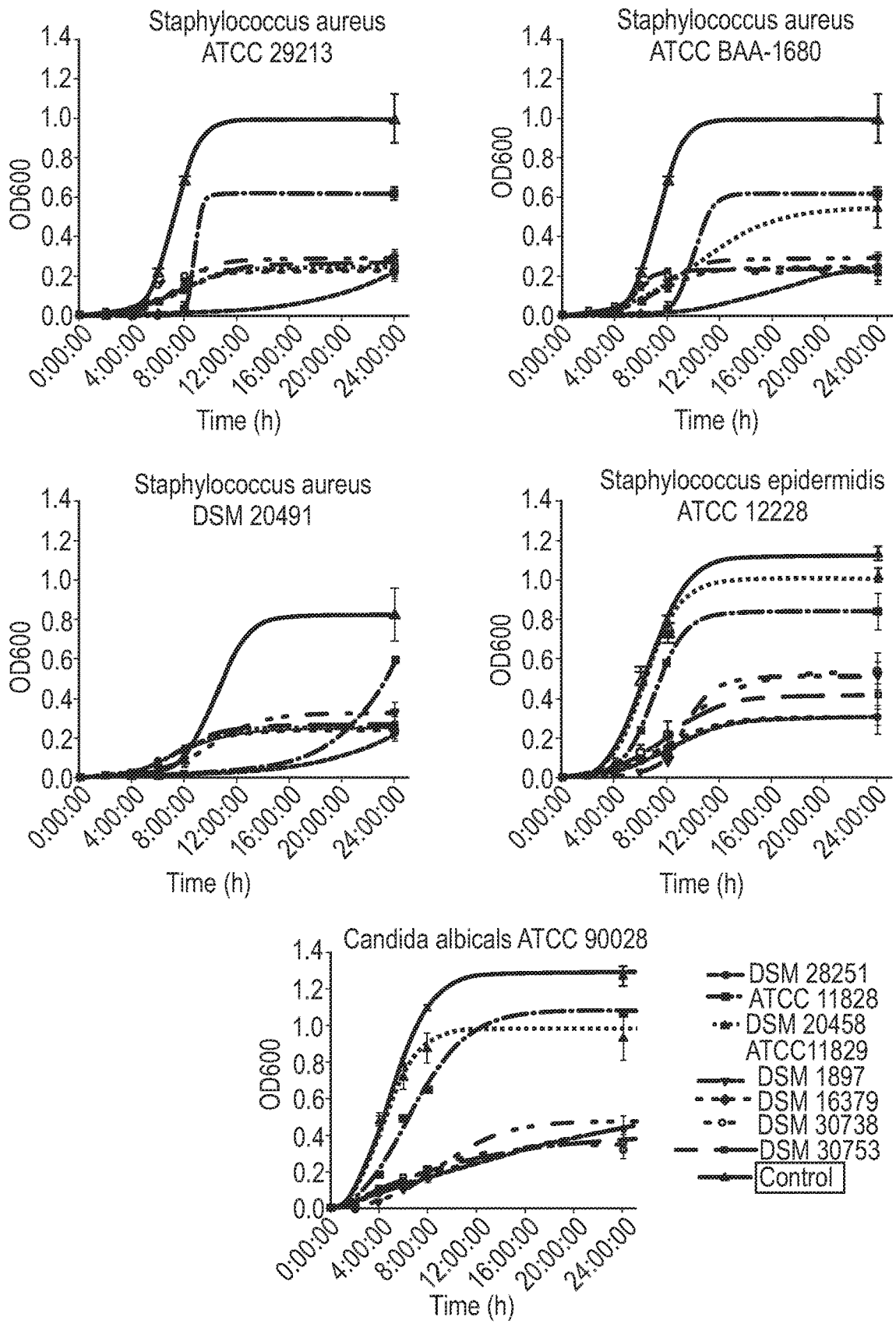
FIG. 8 shows five graphs each illustrating comparative growth curves of strains of *Staphylococcus aureus* (three different strains), *Staphylococcus epidermidis* and *Candida albicans* inoculated with (plus Control without strains) supernatants from seven known strains of *Cutibacterium acnes* and from the (comparative) strain *Cutibacterium acnes* DSM 28251.

Growth curves of the pathogenic microorganism of the skin in the presence and absence (control) of the postbiotic of strain *C. acnes* DSM 28251 are shown in FIG. 8.

A first qualitative evaluation of the AUC (Area Under the Curve) shows that the probiotic (supernatant) obtained from strain *C. acnes* DSM 28251 has the highest inhibitory action on microbial growth for most of the tested pathogenic microorganisms.

Table 1a shows the quantitative AUC evaluation for each supernatant. These values confirm what demonstrated in FIG. 1. Indeed, the postbiotic/supernatant *C. acnes DSM 28251* inhibits the growth of all skin bacteria tested more than the other supernatants tested with the only exception of *C. albicans* ATCC 90028 (which is inhibited by DSM 30738 derivative).

TABLE 1a

Values of Area Under the curve (AUC) and relative Standard Errors (light blue) of growth curves showed in FIG. 1 with/without (control) bacterial supernatant. The color scale for each strain indicates the range of AUC values: from minor (dark red) to major (dark green) AUC value.

|  |  | DSM 28251 | ATCC 11828 | DSM 20458 ATCC 11829 | DSM 1897 | DSM 16379 | DSM 30738 | DSM 30753 | Control |
|---|---|---|---|---|---|---|---|---|---|
| *S. aureus* ATCC 29213 | Total Area | 1.86 | 5.24 | 3.35 | 3.916 | 3.29 | 4.11 | 3.63 | 14.58 |
|  | Std. Error | 0.07 | 0.3 | 0.51 | 0.06 | 0.14 | 0.61 | 0.58 | 1.02 |
| *S. aureus* ATCC BAA-1680 | Total Area | 2.16 | 5.23 | 5.96 | 3.89 | 3.36 | 4.16 | 4.09 | 14.61 |
|  | Std. Error | 0.34 | 0.33 | 0.81 | 0.06 | 0.52 | 0.61 | 0.52 | 1.02 |
| *S. aureus* DSM 20491 | Total Area | 1.86 | 4.87 | 3.34 | 3.35 | 3.27 | 3.51 | 3.57 | 7.57 |
|  | Std. Error | 0.07 | 0.15 | 0.52 | 0.53 | 0.138 | 0.387 | 0.575 | 1.12 |
| *S. epidermidis* ATCC 12228 | Total Area | 3.74 | 12.39 | 16.00 | 4.97 | 4.07 | 6.36 | 5.38 | 17.09 |
|  | Std. Error | 0.75 | 0.76 | 0.37 | 0.62 | 0.35 | 0.82 | 0.48 | 0.33 |
| *C. albicans* ATCC 90028 | Total Area | 8.37 | 22.35 | 23.74 | 8.37 | 8.70 | 7.19 | 7.79 | 30.47 |
|  | Std. Error | 0.67 | 0.21 | 1.22 | 0.56 | 0.15 | 0.44 | 0.35 | 0.46 |

The percentage of growth reduction versus the control conditions obtained by the tested supernatants, is showed in Table 1 b. These data also confirm the results discussed so far, further highlighting that the activity of the supernatant DSM 30738 on *C. albicans* ATCC 90028 strain is only slightly higher and therefore comparable to that of supernatant *C. acnes* DSM 28251.

TABLE 1b

Growth decreasing percentage respect to the control condition (without supernatant inocula). The color scale for each strain indicates the range of decrease: from major (dark red) to minor (dark green) growth decrease (%).

|  | DSM 28251 | ATCC 11828 | DSM 20458 ATCC 11829 | DSM 1897 | DSM 16379 | DSM 30738 | DSM 30753 |
|---|---|---|---|---|---|---|---|
| S. aureus ATCC 29213 | 87.22 | 64.05 | 77.01 | 73.14 | 77.45 | 71.80 | 75.09 |
| S. aureus ATCC BAA-1680 | 85.24 | 64.18 | 59.23 | 73.40 | 76.99 | 71.54 | 72.00 |
| S. aureus DSM 20491 | 75.44 | 35.70 | 55.92 | 55.79 | 56.82 | 53.63 | 52.88 |
| S. epidermidis ATCC 12228 | 78.12 | 27.50 | 6.38 | 70.93 | 76.16 | 62.80 | 68.52 |
| C. albicans ATCC 90028 | 72.52 | 26.65 | 22.09 | 72.54 | 71.46 | 76.40 | 74.43 |

Results

A first AUC qualitative evaluation shows that postbiotic/supernatant of C. acnes DSM 28251 has an improved inhibitory effect on microbial growth for all the tested pathogenic microorganism of the skin.

Example 7

The comparative test of Example 5 was repeated using cell-wall fragments of all the tested strains of C. acnes (instead of heat-killed strains of Example 5).

Aim of the Test

The aim of this test was to compare the inhibitory activity of wall fragments of the same six Cutibacterium strains of Example 5 on the same pathogenic microorganisms of the skin of Example 5.

The aim of this study was to assess whether a wall fragment from strain C. acnes DSM 28251 has an improved inhibitory activity on pathogenic microorganism of skin compared to fragment of the bacterial wall of the comparative C. acnes species of Example 5.

Material and Methods

Preparation of the Wall Fragments of C. acnes DSM 28251 and Comparative C acnes Strains.

The C. acnes DSM 28251 strain and the Cutibacterium strains ATCC® 11829, DSM 16379, DSM 30738, DSM 30753 and DSM 1897, were grown at 37° C. in BHI medium supplemented of 20% in concentration.

The cultivation was operated in batch and scaling up systems from 5 to 1000 ml volumes and prolonged until the obtainment of a consistent cellular mass (meanly 2 days in the higher volume of inoculum). The obtained bacterial pellets were then collected and subjected to the procedure standardized to obtain the wall fragment of interest, as following described. Hereafter, the isolate fragments will be referred to with the cataloguing code of the derivation strains.

Specifically, the isolation of wall fragments has been performed as following described.

The bacterial pellet was previous subjected to the delipidation procedure by Soxhlet treatment using an organic solvent (i.e. Ether-Ethanol, Chloroform, Methanol-Chloroform, mixtures thereof) solvents subsequently; then it was dried under the hood laminar flow. After drying, the pellet was homogenized by 2 steps of Ultratturrax treatment (20 seconds to 10 min each), adding distilled water (in the proportion of 1:2 p/V). After centrifugation, the supernatant was warmed at 80° C. and then cooled under cool water, preferably at 3 to 15° C., and finally on ice. Subsequently, the fragment precipitation step was performed incubating with 15-40% v/v cool ammonium sulphate for 24 hours at 4° C. After incubation, the suspension was centrifuged, and the precipitated fragment was collected and lyophilized.

The lyophilized specimens were finally sterilized through the ad-hoc multi-step procedure (−80° C. ultra-freezing, 80° C. over-heating, 1 hour U.V. sterilization).

Finally, they were used to set up the experiment, as follow described.

Spectrophotometric Assessment of the Activity of Postbiotics on the Pathogenic Microorganism Growth.

The activity of the wall fragments originating from the C. acnes strains (see above) to interfere and/or inhibit with/on the growth of the same Staphylococcus strains and a C. albicans strain reported in Example 5 was evaluated using a spectrophotometric method.

The wall fragments were tested using the same growth medium of Example 5 (BHI broth, supplemented of 20% in concentration) through the following procedure:

The wall fragments were powdered and emulsified in BHI growth medium at the final concentration of 10 mg/ml. 100 μl aliquots were added to the wells of 96 well flat bottom plates.

In triplicate, 100 ul of active cultures of skin pathogenic microorganisms S. aureus ATCC® BAA-1680 ™, S. aureus DSM 20491, S. aureus ATCC® 29213 ™, S. epidermidis ATCC® 12228 ™ and C. albicans ATCC® 90028 ™ were inoculated into the wells of each fragment. Each bacterial strain was previously grown in BHI medium at 37° C. until the exponential growth stage and the cells collected through centrifugation at 3000 rpm for 5 minutes. The pellet was resuspended in fresh BHI medium to obtain suspensions with a concentration of 1×105 CFU/ml.

These suspensions were used as inocula into the wells of 96 well plate.

The 96 well plates were prepared in triplicates, each with experimental controls, i.e. strains inoculum alone without any added fragment, and the "blanks" of experiment (BHI medium with each fragment) for the spectrophotometric calibration.

The Optical Density at 600 nm (O.D. 600 nm) was measured using VICTOR Multilabel Plate Reader (PerkinElmer) system and it was considered as the growth value at time zero (T0) for each strain and treatment. Subsequent measurements were performed after 2, 4, 6, 8, 18, 20, 22 e 24 hours during the incubation period. The O.D. values were normalized against blanks and controls and then analyzed to evaluate the growth trend of the different germs with/without (CTR) the wall fragments. The results were reported as mean value±S.D. (Standard Deviation), and the growth curves were obtained by non-linear regression analysis using a Sigmoidal function suitable for bacterial growth. The analyzes were performed with the software GraphPad Prism version 7.0a.

RESULTS (*C. acnes* Wall Fragments)

Figure 10:
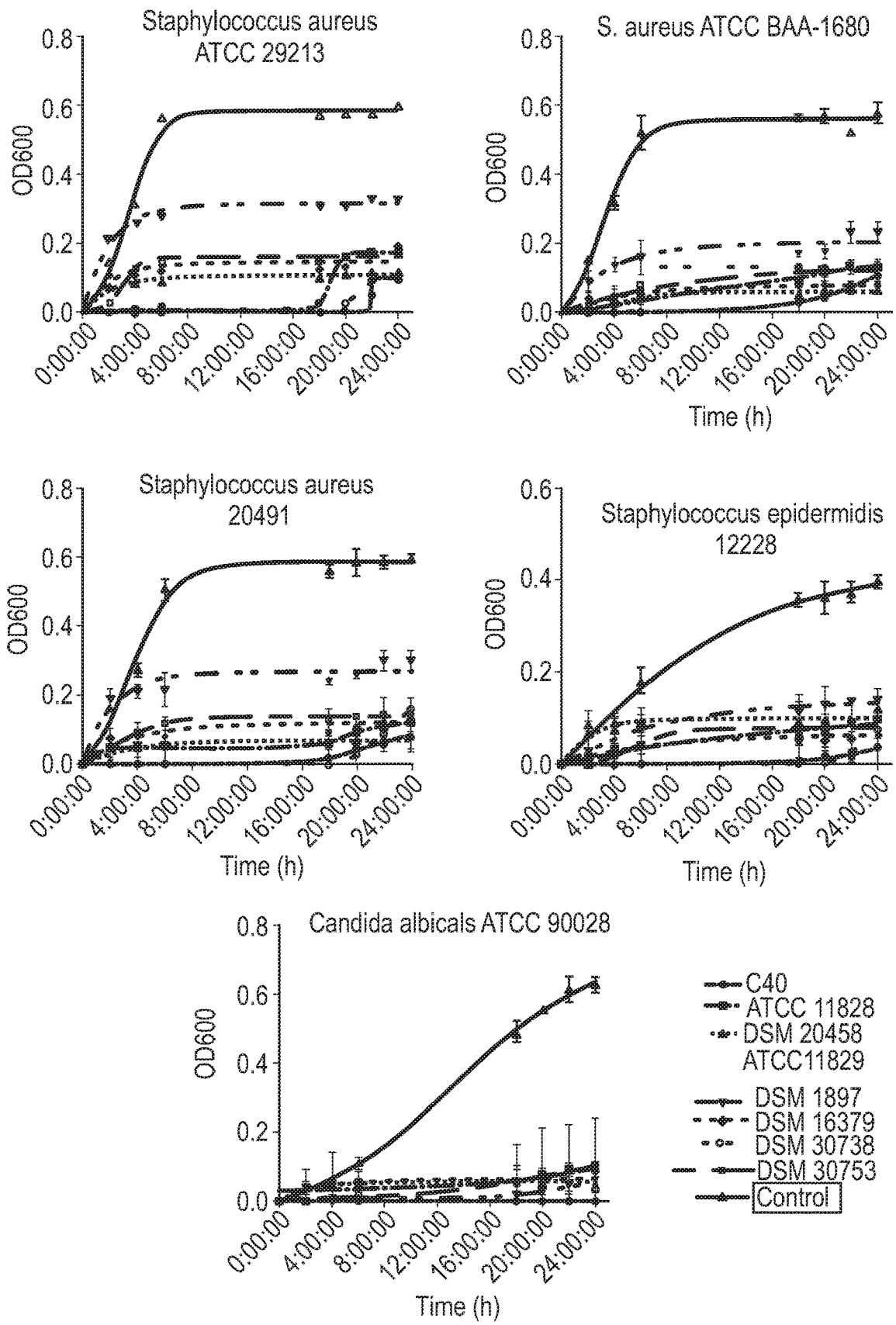
FIG. 10 shows five graphs each illustrating comparatives growth curves of three strains of *Staphylococcus aureus*, one strain of *Staphylococcus epidermidis* and one strain of *Candida albicans* each in a medium inoculated with bacterial wall fragments obtained by homogenizing and following gradient separation of seven different known strains of *Cutibacterium acnes* and by the strain *Cutibacterium acnes* DSM 28251 (comparative bacterial wall fragment).

The growth curves of cutaneous bacteria cultivated with and without (CTR) the diverse tested wall-fragments are shown in FIG. 10. Based on a preliminary qualitative evaluation of the "Area Under the Curve" (AUC) parameter, it is highlighted how for the majority of the tested skin germs the fragment DSM 28251 produces the highest inhibitory action on the microbial growth.

Instead, in the following table 3a the results of a quantitative evaluation of the same AUC parameter for all the skin germs tested are reported. The calculated AUC values confirm the hypothesis formulated through the qualitative evaluation. The bacterium cell wall fragment DSM 28251 demonstrated a higher inhibitory effect on the bacteria growth than the other tested fragments.

Going deeply inside the estimation of the growth inhibition, the values shown in Table 3b represent the percentages of growth reduction (%) respect to the control condition of each strain which is considered as 100% of the growth rate in the specific experimental conditions. The comparing of growth percentage reductions was consistent with the conclusion discussed above about the higher inhibitory effect of the fragment of strain DSM 28251.

Although the fragment obtained from the *C. acnes* DSM 30738 strain demonstrate close inhibition values compared to the DSM 28251 fragment, the inhibition percentage of the latter always results higher, also with a better performance against the *S. aureus* ATCC BAA-1680 strain (82, 43% for DSM 30738 vs 94.95% for DSM 28251).

TABLE 3a

Values of Area Under the curve (AUC) and relative Standard Errors (light blue) of growth curves showed in FIG. 3 with/without (control) bacterial wall fragments. The color scale for each strain indicates the range of AUC values: from minor (dark red) to major (dark green) AUC value.

|  |  | DSM 28251 | ATCC 11828 | DSM 20458 ATCC 11829 | DSM 1897 | DSM 16379 | DSM 30738 | DSM 30753 | Control |
|---|---|---|---|---|---|---|---|---|---|
| *S. aureus* ATCC 29213 | Total Area | 0.20 | 1.13 | 2.23 | 6.63 | 2.89 | 0.70 | 3.19 | 11.73 |
|  | Std. Error | 0.11 | 0.15 | 0.24 | 0.22 | 0.16 | 0.15 | 0.28 | 0.26 |
| *S. aureus* ATCC BAA-1680 | Total Area | 0.57 | 1.66 | 1.09 | 3.87 | 1.53 | 1.99 | 1.99 | 11.34 |
|  | Std. Error | 0.31 | 0.088 | 0.11 | 0.32 | 0.16 | 0.20 | 0.082 | 0.31 |
| *S. aureus* DSM 20491 | Total Area | 0.36 | 1.47 | 1.35 | 5.40 | 2.14 | 0.39 | 2.72 | 11.26 |
|  | Std. Error | 0.35 | 0.16 | 0.16 | 0.32 | 0.28 | 0.15 | 0.24 | 0.23 |
| *S. epidermidis* ATCC 1228 | Total Area | 0.15 | 1.27 | 2.14 | 2.21 | 1.07 | 0.15 | 1.21 | 6.03 |
|  | Std. Error | 0.34 | 0.18 | 0.34 | 0.33 | 0.17 | 0.32 | 0.15 | 0.20 |
| *C. albicans* ATCC 90028 | Total Area | 0.03 | 1.27 | 1.15 | 0.48 | 1.20 | 0.03 | 0.90 | 7.35 |
|  | Std. Error | 0.10 | 0.35 | 0.35 | 1.20 | 0.12 | 0.28 | 0.33 | 0.22 |

TABLE 3b

Growth decreasing percentage respect to the control condition (without fragment inocula). The color scale for each strain indicates the range of decrease: from major (dark red) to minor (dark green) growth decrease (%).

|  | DSM 28251 | ATCC 11828 | DSM 20458 ATCC 11829 | DSM 1897 | DSM 16379 | DSM 30738 | DSM 30753 |
|---|---|---|---|---|---|---|---|
| *S. aureus* ATCC 29213 | 98.29 | 90.38 | 80.99 | 43.44 | 75.32 | 94.02 | 72.83 |
| *S. aureus* BAA-1680 | 94.95 | 85.36 | 90.39 | 65.89 | 86.49 | 82.43 | 82.41 |
| *S. aureus* DSM 20491 | 96.82 | 86.96 | 88.03 | 52.02 | 80.96 | 96.54 | 75.84 |

TABLE 3b-continued

Growth decreasing percentage respect to the control condition (without fragment inocula). The color scale for each strain indicates the range of decrease: from major (dark red) to minor (dark green) growth decrease (%).

|  | DSM 28251 | ATCC 11828 | DSM 20458 ATCC 11829 | DSM 1897 | DSM 16379 | DSM 30738 | DSM 30753 |
|---|---|---|---|---|---|---|---|
| S. epidermidis ATCC 12228 | 97.49 | 78.86 | 64.54 | 63.28 | 82.16 | 97.46 | 79.99 |
| C. albicans ATCC 90028 | 99.63 | 82.67 | 84.34 | 93.46 | 83.61 | 99.54 | 87.70 |

The invention claimed is:

1. An inactivated bacterial strain or a fragment or a lysate thereof, wherein the inactivated bacterial strain is *Cutibacterium acnes* deposited under deposit Accession No. DSM 28251 with International Deposit Authority Leibniz-Institut DSMZ-Deutsche Sammlung von Mikroorganismen und Zellkulturen GmbH.

2. A postbiotic product comprising heat killed cells or the supernatant of mechanically lysed cells, or cell wall fragments of the bacterial strain of *Cutibacterium acnes* deposited under deposit Accession No. DSM 28251 with International Deposit Authority Leibniz-Institut DSMZ-Deutsche Sammlung von Mikroorganismen und Zellkulturen GmbH.

3. The postbiotic product of claim 2, wherein the lysed cells are obtained by mechanical lysis of the cell wall.

4. A fragment of the cell wall of the bacterial strain of claim 1.

5. The inactivated bacterial strain of claim 1, wherein the bacterial strain is inactivated by tyndallization.

6. A composition comprising *Cutibacterium acnes* deposited under deposit Accession No. DSMZ 28251 according to claim 1, or a postbiotic product thereof according to claim 2 or a fragment of the cell wall thereof according to claim 4 and a physiologically acceptable carrier.

7. A composition according to claim 6, wherein the composition is in a form for topical application.

8. A method for the treatment or prevention of an inflammatory or allergic disease or infection of the skin or mucosa in a subject, said method comprising administering or topically applying to said subject a composition comprising an effective amount of *Cutibacterium acnes* deposited under deposit Accession No. DSMZ 28251 according to claim 1, or a postbiotic product thereof according to claim 2 or a fragment of the cell wall thereof according to claim 4.

9. The method according to claim 8, wherein the composition is in a form for topical application.

10. The method according to claim 8, wherein the infection is a bacterial or fungal infection.

11. The method as claimed in claim 8, wherein the inflammatory or allergic disease of the skin is eczema, atopic dermatitis, acne, seborrheic dermatitis, rosacea, psoriasis, erythema or cutaneous rash.

12. The method according to claim 10, wherein the fungal infection of the skin or mucosa is an infection of *Candida*.

13. The method according to claim 8, wherein the inflammatory or allergic disease or infection of the skin or mucosa is a vaginal infection or inflammation.

14. The method according to claim 13, wherein the vaginal infection or inflammation is vaginitis.

15. A method for the treatment of hemorrhoids, anal rhagades or skin scars in a subject, said method comprising applying to the skin of said subject a composition according to claim 6.

16. A method for the topical treatment of wounds, injuries, abrasion, ulcerations of the skin, or pressure ulcers or to heal wounds in a subject, said method comprising applying to the skin of said subject a composition according to claim 6.

17. A postbiotic product which is the total supernatant obtainable by a fermentative process of the bacterial strain of claim 1.

18. The bacterial strain of claim 7, wherein the topical application is in the form of a cream, a foam, an ointment, a paste, a powder, a gel, a solution, an ovum, a douche or an emulsion.

\* \* \* \* \*